(12) United States Patent
Merrick et al.

(10) Patent No.: US 7,028,312 B1
(45) Date of Patent: Apr. 11, 2006

(54) XML REMOTE PROCEDURE CALL (XML-RPC)

(75) Inventors: Phillip Merrick, Burke, VA (US); Stewart Allen, Fairfax, VA (US); Joseph Lapp, Fairfax, VA (US)

(73) Assignee: webMethods, Fairfax, VA (US)

( * ) Notice: Subject to any disclaimer, the term of this patent is extended or adjusted under 35 U.S.C. 154(b) by 0 days.

(21) Appl. No.: 09/274,979

(22) Filed: Mar. 23, 1999

Related U.S. Application Data

(60) Provisional application No. 60/096,909, filed on Aug. 17, 1998, provisional application No. 60/079,100, filed on Mar. 23, 1998.

(51) Int. Cl.
*G06F 9/44* (2006.01)

(52) U.S. Cl. .................. 719/330; 709/219; 709/203

(58) Field of Classification Search ........ 709/310–320, 709/328, 329, 330, 200–203, 217–219; 719/310–320, 719/328–329, 330
See application file for complete search history.

(56) References Cited

U.S. PATENT DOCUMENTS 6,041,365 A * 3/2000 Kleinerman ............ 709/328
6,466,971 B1 * 10/2002 Humpleman et al. ....... 709/220
6,480,860 B1 * 11/2002 Monday ................. 707/102
6,546,419 B1 * 4/2003 Humpleman et al. ....... 709/223

OTHER PUBLICATIONS

Merrick et al., "Web Interface Definition Language (WIDL)", NOTE-widl-970922, http://www.w3.org/TR/NOTE-widl-970922, Submitted to W3C Sep. 22, 1997, pp. 1-16.*
(No author given), "Extensible Markup Language (XML)—W3C Working Draft Nov 14, 1996", http://www.w3.org/TR/WD-xml-961114.html, Nov. 14, 1996, pp. 1-28.*
Bosak, Jon, "XML, Java, and the future of the Web", Sun Microsystems, http://www.ibiblio.org/pub/sun-info/standards/xml/why/xmlapps.htm, Mar. 10, 1997, pp. 1-9.*
Goldfarb et al., "The XML Handbook", Prentice Hall, pp. 555-568, 1998.*
Winer, Dave, "RPC over HTTP via XML", http://davenet.userland.com/1998/02/27/rpcOverHttpViaXml, Feb. 27, 1998, pp. 1-7.*
(No author given) "Extensible Markup Language (XML)—W3C Working Draft Nov. 14, 1996", W3C, document# WD-xml-961114, pp. 1-27, Nov. 14, 1996.*
(No author given) Extensible Markup Language (XML) 1.0—W3C Recommendation Feb. 10, 1998, document# REC-xml-19980210, p. 1-32, Feb. 10, 1998.*

(Continued)

*Primary Examiner*—St. John Courtenay, III
(74) *Attorney, Agent, or Firm*—Sughrue Mion, PLLC

(57) ABSTRACT

A Remote Procedure Call (RPC) uses a message expressed in a mark-up language message encoding, with type labels indicating data item types.

55 Claims, 13 Drawing Sheets

OTHER PUBLICATIONS

Winer, Dave, "Frontier and XML", http//frontier.userland.com/stories/storyReader$1124, Mar. 1, 1998, p. 1-2.*
St.Laurent et al., "Programming Web Services with XML-RPC", O'Reilly, Forward section, pp. ix-xii, 2001.*
Tigue, "XML Enabled Mechanisms for Distributed Computing on the Web", Documation East 1997, Oct. 20, 1997.
Winer, "RPC over HTTP via XML", http://davenet.userland.com/1998/02/27/rpcOverHttpViaXml, Feb. 27, 1998.
Tigue et al, "WebBroker: Distributed Object Communication on the Web", http://www.w3.org/TR/1998/NOTE-webbroker-19980511/, May 11, 1998.
Walsh, "Microsoft spearheads protocol push", http://www.infoworld.com/cgi-bin/displayStory.pl?980710.whsoap.htm, Jul. 10, 1998.
Winer, "XML-RPC for Newbies", http://davenet.userland.com/1998/07/14/xmlRpcForNewbies, Jul. 14, 1998.
Winer, "XML-RPC for Geeks", http://davenet.userland.com/1998/07/19/xmlRpcForGeeks, Jul. 19, 1998.
"Allaire Announces the Web Distributed Data Exchange (WDDX)", http://www2.allaire.com, Dec. 8, 1998.
Winer, "The Politics of Plumbing", http://davenet.userland.com/1999/02/04/politicsofplumbing, Feb. 4, 1999.
http://www.xmlrpc.com, Oct. 1, 1999.
Lapp, "WIDL", presentation slides from a speech delivered at XML '98 on Nov. 17, 1998.
Lapp, "XML IDL and XML RPC", posting to XML.org web site on Sep. 22, 1998.
webMethods Web Automation Toolkit Adds Visual Basic and "Intelligent Document" Support, webMethods press release Dec. 10, 1997.
"webMethods Announces XML-Based Web Automation Toolkit To Be Available Free on the Internet", webMethods press release Mar. 4, 1998.
"What Is XML?", http://www.webmethods.com/xml/about_xml.html, Feb. 20, 1999.

* cited by examiner

XML REMOTE PROCEDURE CALL (XML-RPC)

The present application is based on and claims priority from Application No. 60/079,100 filed Mar. 23, 1998 and Application No. 60/096,909 filed Aug. 17, 1998, the disclosures of which are incorporated by reference herein.

BACKGROUND OF THE INVENTION

Remote Procedure Call (RPC) is a mechanism by which an application residing on one machine requests the services of an application residing on another machine. A machine (as the term is used here and in the appended claims) may be a physical CPU or computer, a virtual CPU or virtual computer (otherwise known as a virtual machine or VM), or it may be a space of addressable memory in a system that isolates applications or processes so that they may not directly invoke one another. RPC requires one application to send one or more messages to another application in order to invoke a procedure of the other application. The recipient application may reply by sending one or more messages back to the requesting application. The term "RPC" identifies both the mechanism by which this occurs and the instance of such an exchange between applications.

Applications engaged in RPC conventionally do not message each other directly. Instead they rely on intervening software called "middleware" to translate between the wire protocol and the programming-language-specific functions or class methods of the application. This application uses the term "service" to generically refer to a function (including a procedure or a class method) or any action to be taken or performed, including access to web sites and databases. The term "wire protocol" refers to the transfer-protocol/message-encoding combination that the programs use as their common language for communication. The transfer-protocol is the mechanism by which the message transfers between the applications, and the message-encoding is the format in which the message is represented. The Object Management Group's IIOP (OMG Internet Inter-ORB Protocol) and the Open Software Foundation's DCE (OSF Distributed Computing Environment) are examples of wire protocols, and each defines both a transfer-protocol and a message-encoding. RPC has in the past been implemented using IIOP, DCE, or proprietary protocols. HTTP is an example of a transfer-protocol that is independent of message-encoding. The IIOP and DCE protocols have themselves been encoded into messages that tunnel through HTTP.

Each message-encoding is a particular format for representing a message. Any set of data may be represented in a particular format, not just RPC messages. This application uses the term 'data-package' to refer to each such set of data, and it uses the term 'encoding' to refer to the format in which a data-package is represented. An RPC message is a kind of data-package, and a message-encoding is the encoding of an RPC message. A tab-delimited file is an example of a simple encoding. The binary representation of a C programming language data structure is an example of a more complex encoding. A data-package may be thought of as a collection of individual data items. In a tab-delimited file, each row is a data item, as is each field in each row. In a C data structure, each field is a data item, as is each nested data structure and each field in each nested data structure. Notice that a data item may contain one or more other data items.

An 'argument' is a particular kind of data item. The term argument is used in the software industry to refer to a data item that is passed to a function or that is returned from a function. When the signature of a function is represented in the Java programming language, the arguments of the function consist of the comma-delimited terms that appear in parentheses and the term that represents the return value of the function. Consider the following function signature:

EmployeeID addEmployee(Name n, Address a, JobType t)

This function has four arguments whose classes are EmployeeID, Name, Address, and JobType. The Address class might be defined as follows:

```
class Address {
    String street;
    String city;
    String state;
    String zip;
}
```

In other contexts one might interpret the street, city, state, and zip data items to each be an argument of the function, but this application defines 'argument' such that these data items are not arguments. The arguments of a function are those data items that the signature of the function identifies, where for purposes of this definition the definitions of the argument types are not considered to be part of the signature.

A function is only one kind of service, and XML RPC messages can exist in the absence of functions. Hence, it is necessary to define the term 'argument' in terms of the message encoding. Therefore, given a data item X contained in message M1 expressed in encoding E, X is an argument when it satisfies both of the following requirements: (1) there exists a message M2 also expressed in E such that M2 is constructed by adding a data item Y to M1 where neither X contains Y nor Y contains X; and (2) X is not contained in any data item having property (1). It is possible to define an encoding that hard-codes arguments relative to another encoding so that the defined encoding expresses a subset of the messages of the other encoding. Consequently, a message cannot be examined for arguments without interpreting the message with respect to a particular encoding.

Each argument is an input argument, an output argument, or both an input and an output argument. The return value is always an output argument, but function signatures usually do not indicate which if the remaining arguments are input arguments or output arguments. The input arguments and output arguments must be established by convention. The input arguments are those arguments that the software that invokes the function uses to pass data items to the function. The output arguments are those arguments that the function uses to pass data items to the software that invoked the function. It is possible for one argument to be used for both purposes. In this case, the argument appears in both the RPC request message and the RPC reply message, although the values of the occurrences may differ. The OMG CORBA specification provides further treatment of the distinction between input and output arguments in the context of RPC.

In addition to containing data items, a data-package may contain labels. A label is an identifier that provides information about one or more data items. A label that provides information about a data item is said to be a label for the data item. No data item is a label, since the encoding assumes responsibility for providing the association between the data item and the label.

This application defines two kinds of labels: type labels and semantic labels. A type label identifies the data type of each associated data item. Data types include the primitive data types that programming languages define. The primitive data types include integers, floats, longs, strings, and booleans. According to this definition, data types also include primitive data structures, such as arrays, records, and vectors (e.g. the Java Vector class). Data types provide the information that is necessary to represent the data item in memory so that a programming language may use the data item. However, there is no requirement that any two programming languages or any two implementations of RPC represent the same data types in the same way.

A semantic label is an identifier that names an associated data item according to the data item's role within the message. The purpose is to allow software that consumes the message to locate data items by role. The semantic label of an argument is analogous to the name that a method signature gives to the argument. Again consider the following signature:

EmployeeID addEmployee(Name n, Address a, JobType t)

This function has arguments named 'n', 'a', and 't'. It also has an unnamed argument whose type is EmployeeID. The names may be used as semantic labels for their associated arguments. The semantic label of a field found in a class, record, or structure is analogous to the name given to that field. Consider the previously given definition of the Address class. It has four data items. Each has a data type of string, and their names are 'street', 'city', 'state', and 'zip'. These names may be used as the semantic labels for the associated data items. However, unlike the names of a programming language structure, multiple data items may have the same semantic labels. For example, two data items may each have the 'street' label to indicate that they each represent one line of the street address. On the other hand, an array or a vector may contain multiple data items such that a semantic label is associated with the entire array or vector but not with each data item.

This application classifies encodings as either self-describing or non-self-describing. A self-describing encoding associates a semantic label with each argument and includes both the label and the association within each data-package. A completely self-describing encoding associates a semantic label with every data item except possibly for the data item constituents of arrays and vectors. A semantic label allows a program to identify a data item without requiring the program to know in advance the location of the data item within the data-package and without requiring the program to know the exact structure of the data-package. One example of a data-package that uses a self-describing encoding is a tab-delimited file that begins with a row consisting of the names of each field in a row. Another self-describing encoding is the binary representation of a hash table, which assigns a name (or key) to each data item in the table. Non-self-describing encodings do not contain semantic labels for their arguments. A program that reads a data-package expressed in a non-self-describing encoding must assign semantics to each argument by applying information found in the application and not in the data-package. For example, a program that reads a tab-delimited file to load records into a database must know in advance how to correlate the fields in the file to the columns of the database table.

This application also classifies encodings as either specific or generic. A specific encoding is an encoding that is designed to represent an application-specific or industry-specific data structure. A generic encoding is an encoding that is designed to represent any or nearly any data structure, regardless of application or industry. For example, the ASCII form of a database report is a specific encoding since it can express the data found in a particular database but not the data found in any database. Packet headers in communications protocols also use specific encodings. An implementation of the C programming language uses a generic encoding to represent in-memory data structures; this is a generic encoding because one encoding scheme is capable of representing any C data structure.

Finally, this application distinguishes between binary encodings and text-based encodings. A text-based encoding is a human-readable and human-writable encoding. Data-packages expressed in a text-based encoding can be loaded into a text editor and can be read and modified by humans using the text editor. A human can also create a data-package expressed in a text-based encoding by writing the message completely from scratch using the text editor. Text editors include vi, emacs, MS-DOS EDIT.EXE and Microsoft Notepad. Binary encodings are those encodings that do not satisfy these human-accessibility criteria. Tab-delimited files are examples of data expressed in a text-based encoding, while the in-memory representation of C data structures is an example of a binary encoding.

The IIOP and DCE wire protocols use non-self-describing generic binary encodings. Of all the example encodings discussed in this application, the IIOP and DCE encodings are most closely analogous to the in-memory binary representations of C or C++ data structures. However, the analogy is not perfect because the encodings have been designed to support the data structures found in a variety of languages, and because they have been designed to support the translation of data between a variety of platforms.

Although IIOP and DCE are non-self-describing, it is possible to define services in IIOP and DCE that accept self-describing parameters and that invoke other services using the identified parameters. Microsoft's COM (Component Object Model) accomplishes this on top of DCE through the set of services found in its Dispatch interface. By invoking the services of IDispatch, an application can emulate the functionality that would be available through a wire protocol that is natively self-describing. However, DCE remains non-self-describing, since the services of IDispatch are expressed in the same non-self-describing encoding in which all other service invocations of the protocol are expressed. IDispatch effectively defines a high level protocol that is layered on top of DCE. More work is required to develop software that invokes self-describing services through IDispatch than is required to develop software that invokes the native non-self-describing services of DCE. Additional effort is required because to invoke a single self-describing service the developer must write software that conforms to the IDispatch protocol. Invoking a single non-self-describing service only requires the developer to invoke a single function in the code that DCE IDL compilers automatically generate for the developer.

IIOP defines a data-type called 'ANY'. A data item expressed in this type is a container for other data items. The ANY data type associates a type label with each data item that it contains, but it does not associate a semantic label with any of these data items. It also does not associate a type label with the instance of the ANY data item itself, unless the instance happens to be contained within another ANY data item. Consequently, an implementation of IIOP that receives a message containing an instance of the ANY data type cannot determine that the instance is of type ANY simply by examining the message. The recipient of the IIOP message must know in advance that the argument is of type ANY. In fact, the recipient must know the types of all the arguments in order to extract the arguments from the message. This aspect of IIOP makes programs that use IIOP strongly sensitive to changes in the messages. Adding, removing, or changing argument types in the programs that generate the IIOP messages necessitates making analogous changes in all the programs that receive the messages. This would not be necessary in programs that relied on data type labels that the message itself provides.

IIOP and DCE are also stateful, bi-directional, and complex. These protocols are stateful because the client and server must maintain state information to successfully transfer messages between them. The protocols are bi-directional because the server must sometimes asynchronously send messages to the client. Finally, IIOP and DCE are complex because they are designed to provide the union of the features found in a wide variety of programming languages. This latter property of IIOP and DCE allows any two programs to communicate with service invocations that support the rich variety of invocation mechanisms that are common to the programming languages in which the two programs are written.

Traditional middleware implementations are based on the IIOP and DCE protocols and consequently suffer from the following drawbacks:

Because the encodings are generic, translation software is required to allow RPC messaging between a program that uses a specific encoding and a program that uses a generic encoding. Translation software is also required between programs that use different specific encodings. If IIOP or DCE is to be the wire protocol, the translation software must be installed between each program that uses a specific encoding and the communications channel that connects the programs. Furthermore, generic encodings are necessarily more removed from the data structures that are common to a given industry, which prevents most industry experts from examining messages, since expertise with the generic encoding would be required in addition to expertise with the industry data structures.

Because the encodings are binary, special software is required to read, modify, or write the RPC messages. If the message is expressed in a non-self-describing encoding, the special software must be application-specific or industry-specific software. These factors limit the accessibility of messages expressed in the IIOP and DCE encodings, since the translation software must exist, and since one must have translation software on hand to access the messages.

Because these encodings are non-self-describing, programs can't extract and selectively process the data items of an arbitrary message without first being specifically configured to recognize the particular kind of message. Programs that do support configured access to non-self-describing messages generally require separate configuration information for each kind of non-self-describing message. As the message-generating programs evolve the messages and add new message types, the configuration information of the other programs must be updated. To further complicate matters, each program may require different configuration details or separate configuration entry procedures. Finally, if a message-generating program changes the format of a non-self-describing message, the message-consuming programs must also change their knowledge of that message, since otherwise the these programs would not be able to extract and identify the data items found in the message.

Because the IIOP and DCE protocols are stateful, the protocols are not well-suited for messaging using HTTP, since HTTP is a stateless protocol. HTTP provides only a limited mechanism for maintaining client state. Under this mechanism, the client maintains the state information, which means that client-provided state information cannot be trusted to belong to the same client over time, unless the client connects through an authenticated connection. One must therefore inventively design a stateful protocol on top of HTTP in order to tunnel IIOP or DCE through HTTP. It is desirable to use HTTP as the transfer protocol because of the ubiquity with which it is installed on operating systems, and because it is typically the only protocol that network firewalls allow to pass.

Because these protocols are bi-directional, the protocols are not well-suited for messaging using HTTP, since HTTP is unidirectional. For example, an IIOP client may register a callback function with an IIOP server. When it comes time for the server to invoke the callback function, the server cannot issue an HTTP request to the client unless the client is also configured to be an HTTP server. Administrative and security requirements normally make it undesirable to configure a client as an HTTP server. Therefore, one must inventively design a bi-directional protocol on top of HTTP in order to support IIOP and DCE bi-directional behavior.

Because the encodings are intended to bridge applications written in almost any two programming languages on almost any two platforms, the encodings are proportionately complex. IIOP and DCE take the superset approach to bridging applications by ensuring that the encoding can represent nearly every kind of service invocation that programming languages are capable of expressing. To create software that uses IIOP or DCE, a software developer must define the signatures of these services. The superset approach complicates the definitions and minimizes the pool of skilled experts that can develop for IIOP and DCE. This approach also complicates the tools that manipulate messages expressed in these encodings.

Because of the complexity of the IIOP and DCE protocols, implementations from two different vendors are generally incompatible. To get two programs to communicate over a network, the computers running the programs must conventionally run middleware software from the same vendor. Vendors have implemented gateway software to bridge between different implementations of these protocols. The CORBA 2.0 specification has mitigated this problem to a large degree, but it has not eliminated it completely. Thus, integrating programs residing in different organizations often requires either both organizations to agree on the installation or one company to buy additional software to provide a gateway between the existing middleware installations.

Therefore, there is a need for improved RPC techniques that do not suffer from the above drawbacks. The techniques would provide the following benefits:

It would be beneficial to have an RPC mechanism that allows messages to be expressed in application-specific or industry-specific encodings. This would allow programs to communicate without requiring messages expressed in specific encodings to be translated into messages expressed in generic encodings. Provided that the messages were also text-based, this would also allow industry experts to create and examine messages without requiring that they have expertise in a generic encoding. Text-based messages in specific encodings would also be easier to read than text-based messages in generic encodings, since the generality of generic encodings makes generically-encoded messages more verbose.

It would be beneficial to have an RPC mechanism that uses text-based messages, since special software would not be needed to read, write, or modify the messages. Text editors would suffice. People who have expertise in industry data structures would have less reliance on the expertise of others to translate messages into a form that they can understand.

It would be beneficial to have an RPC mechanism that is based on a self-describing encoding such that all messages are at some level expressed in the self-describing encoding. This approach would simplify the programs that access the data items of the messages, since the programs would no longer require configuration information. Furthermore, because the programs that generate and consume the messages could access data items by label, the programs would be less sensitive to changes in the message types.

It would be beneficial to have an RPC mechanism that operated statelessly over HTTP so that less complex software is required to implement RPC over HTTP.

It would be beneficial to have an RPC mechanism that did not support bi-directional communications so that less complex client software is required to implement RPC over HTTP. A unidirectional RPC would not support asynchronous callbacks, and an application that is based on the RPC would have to either select a synchronous solution or install an HTTP server at both ends of the communication channel.

It would be beneficial to have a generic encoding that precludes some of the less widely used features of IIOP and DCE so that the encoding is simpler than IIOP and DCE. It would be beneficial for this generic encoding to contain only those features that are necessary for most business-to-business electronic commerce over the Internet, thus idealizing the encoding for this domain of applications. The approach maximizes the number of software developers that are qualified to produce solutions with the encoding and minimizes the time required to produce each solution.

It would be beneficial to have an RPC framework whose simplicity allows two programs to engage in RPC communications over a network without requiring software from a single vendor to be installed on both of the computers that are running the programs. Software from different vendors should be compatible by virtue of using the nearly ubiquitous HTTP protocol stack to transmit messages whose encodings use a well-defined and well-accepted text-based syntax.

SUMMARY OF THE INVENTION

It is therefore an object of the present invention to provide an improved remote procedure call mechanism, which is both versatile yet simple to implement. The invention is directed to both the method of remote procedure call as well as a system for implementing the method.

It is a further object of the invention to provide a generic message encoding which is less complex.

These and other objects are achieved, according to a first aspect of the present invention, by a method and system for invoking a service at a first machine from a second machine, in which the message encoding is self-describing. In a preferred embodiment, the message encoding is XML, although the invention is not to be so limited. The method according to the invention employs type and/or semantic labeling of arguments and/or data items within arguments. The invention extends to the client sending a request, or a server responding to a request. In one implementation, all arguments and all contained data items are both type and semantically labeled, although labeling, particularly semantic labeling, may be dispensed with for data items contained in an argument, with these data items instead assuming the attribute of the containing argument.

The invention is particularly applicable to remote procedure call (RPC), although it is applicable as well to other types of service invocation. The service invocation request and service invocation reply need not use the same message encoding, or even the same transfer protocol. The method of the invention, and particularly its message encoding, may be used with any of a number of transfer protocols, e.g., HTTP, FTP and SMTP, with its widest use at present being in conjunction with HTTP. In this context, the service to be invoked may be designated in the HTTP header, or in the URL. Alternatively, the service to be invoked may be identified within the message encoding.

According to a further aspect of the invention, a message encoding is provided which is simple yet functional. It is a markup language-based, self-describing message encoding using a set of element type labels which is small, e.g., six in one preferred embodiment, designed to maximize functionality with a minimum of complexity. In addition to labeling each data item with one of the message encoding labels, additional descriptive information for each data item can be provided. The novel encoding is independent of the syntax used to express the encoding, but in the illustrative example the message encoding is XML. In such a case, the additional information for each data item may be provided in the form of XML attributes.

The preferred embodiment uses element types having the following attributes: a VALUE element representing a data item that is a lexical unit, and it has an optional TYPE attribute. The value of the optional TYPE attribute that names the lexical type. VALUE elements that lack the TYPE attribute are assumed to be strings; a RECORD element containing a set of one or more named elements of any type, with each contained element having a NAME attribute, and the value of each NAME attribute being unique among the values of the NAME attributes of all children of the containing RECORD element; a LIST element containing a set of elements which do not have names; or if they do have names, the names are ignored; an OBJECT element referencing any other element by a unique object ID, and serving as a placeholder for the element it references; and NULL element representing a VALUE, a RECORD, a LIST, or an OBJECT for which no data is provided; and an ARRAY element representing a single or multi-dimensional array of elements, and having an optional DIMENSION attribute and an optional TYPE attribute, with the DIMENSION attribute indicating the dimensionality or depth of the array, and the TYPE attribute indicates the type of data found in the array.

Of particular note is the use of an ID attribute and OBJECT element, by which a single data item can be contained in multiple data items, with the ID attribute and the OBJECT element allowing RPC messages to express arbitrary directed graphs, including cyclic graphs.

BRIEF DESCRIPTION OF THE DRAWINGS

The invention will be more clearly understood from the following description in conjunction with the accompanying drawings, in which.

DETAILED DESCRIPTION OF THE INVENTION

Figure 1:
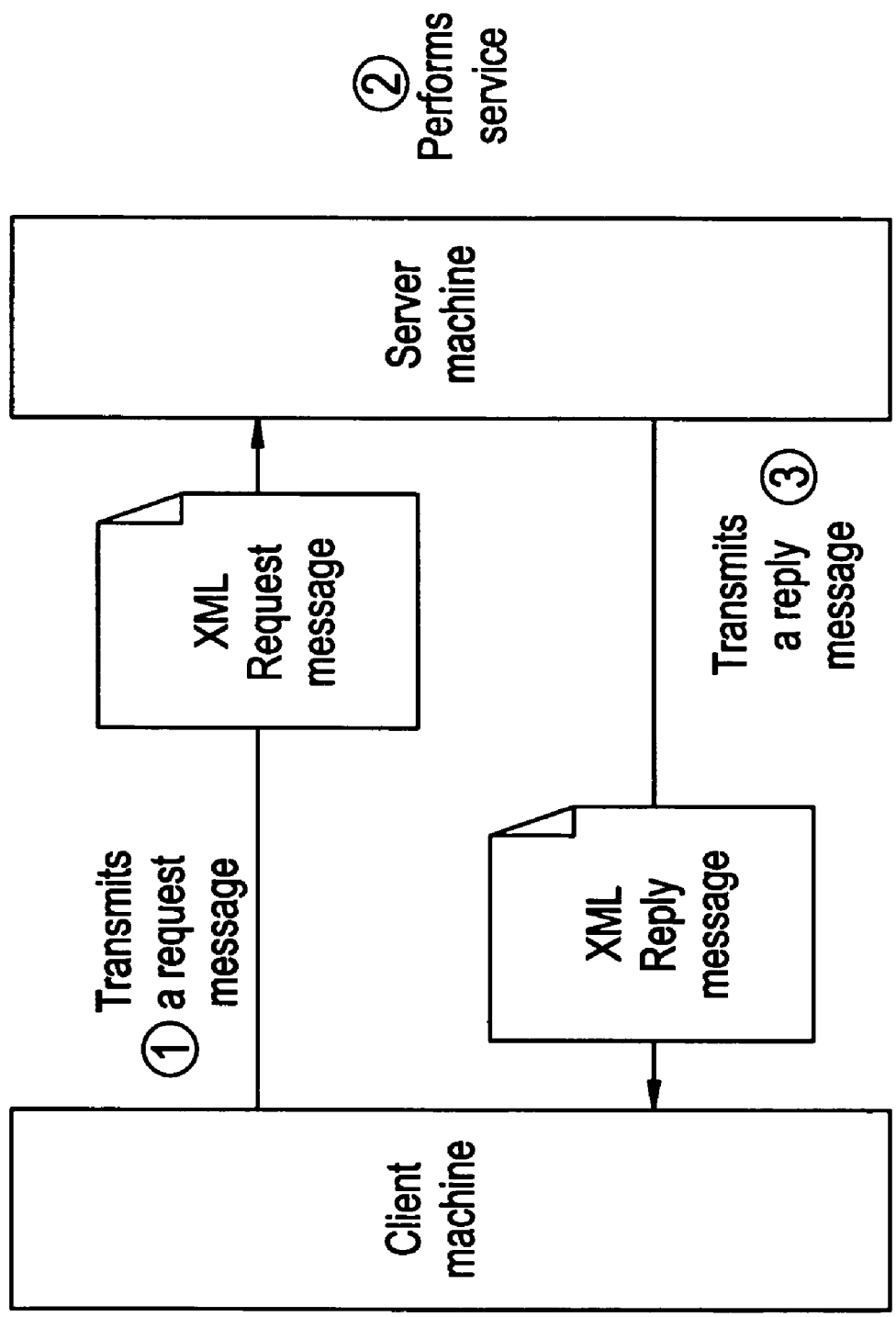
FIG. 1 is a diagram depicting the overall architecture of XML RPC.

Several key aspects of the invention relate to the use of eXtensible Markup Language (XML). XML is a simplification of the ISO Standard Generalized Markup Language (SGML). SGML is a standard document formatting language that enables a publisher to create a single document source that can be viewed, displayed, or printed in a variety of ways. SGML is a large, complex formatting language that is not well suited to the Web. The World Wide Web Consortium (W3C) created XML to make SGML-like functionality available to the broad audience of Internet users. XML is well-understood in the industry, and one can acquire a detailed understanding of it from any number of public sources.

Like SGML, XML defines a class of markup languages rather than a single markup language. Unlike HTML, which defines a set of markup tags such as <P> and <TABLE>, XML defines the syntax of a markup language without defining the tags that constitute any language. For example, HTML does not conform to the XML syntax, but it does closely conform to the SGML syntax. HTML may therefore be thought of as one of many SGML languages. Likewise, one may define many different XML languages, each with its own set of tags. A data-package expressed in XML is known as a document, and an XML language is known as a document type. A document type definition (DTD) defines the tags that are valid in a particular document type along with the valid relations among those tags. SGML uses the same terminology, so HTML is a document type of SGML.

The originally intended purpose of XML is the same as the originally intended purpose of SGML, except that XML was designed to be much simpler. XML allows one to label the information in a document so that one may retrieve the information contained in the document according to its label. Labeling schemes may be chosen according to the requirements of the programs that process the documents. Consider a document expressed in the HTML document type:

The catalog contains these products:<P>
Model <B>233A</B> costs <B>$40.00</B>.<P>
Model <B>124B</B> costs <B>$125.00</B>.

Compare this document to the following, which is expressed in an XML document type that uses special tags not defined in HTML:

```
<CATALOG>
    The catalog contains these products:
        <P>Model <MODEL>233A</MODEL> costs
            <PRICE>$40.00</PRICE>.</P>
        <P>Model <MODEL>124B</MODEL> costs
            <PRICE>$125.00</PRICE>.</P>
</CATALOG>
```

The tags of the HTML document do not clearly label the information they enclose. The <B> tags enclose both the model number and the price, and no distinction is made between products and paragraphs. The XML document uses tags with names that describe the information the tags enclose. One may retrieve the model numbers by retrieving the contents of all MODEL tags, and one may retrieve the prices by retrieving the contents of all PRICE tags. XML allows one to define document types that clearly label the contents of a document.

By descriptively labeling the contents of a document, one may store the document and subsequently put the document to many different purposes. Suppose an XML document has been made available on the Internet. One program may download the document, extract the prices, and perform a calculation on the prices. Another program may look for the MODEL and PRICE tags and render the contents of the document on the screen such that the models and prices are shown in bold. Publishers make heavy use of this feature by leaving the document unchanged while changing the style in which the document is printed. Still another program may search the document for a particular model to return its price. The document can be put to many uses and is thus a significant improvement over word processing documents, which do not differentiate text. XML is therefore well-suited for the publication industry.

XML document types provide additional advantages over HTML. The syntax of HTML is more lax than that of XML, and there are many expressions in HTML whose parses are ambiguous. The above two documents illustrate one ambiguity. The HTML document shown does not close its <P> tags. The following interpretation is therefore possible:

The catalog contains these products:<P>
Model <B>233A</B> costs <B>$40.00</B>.<P>
Model <B>124B</B> costs <B>$125.00</B>.
</P></P>

In this interpretation, one <P> element contains the other as a child. Ambiguities such as these limit one's ability to use the document with many tools, since each tool may interpret the document differently. XML eliminates these ambiguities by enforcing strict syntax and thus improves software interoperability.

XML documents consist primarily of three syntactic features: elements, attributes, and character data. An element consists of a start tag, an end tag, and all data between the start tag and end tag. Each element has an element type name, which is the name that identifies the element within a tag. In the above XML document, the element type names are CATALOG, P, MODEL, and PRICE. An element start tag may optionally contain a set of attributes. Each attribute consists of an attribute name and an attribute value. Attributes also exist in HTML. Finally, an element may contain character data between its tags. These are the characters that do not appear in either within any tag. XML requires that every document have a root element which contains all character data and all other elements of the document.

Although XML was designed to represent documentation, one may also use it to represent data. Consider the following XML document:

```
<CATALOG>
    <PRODUCT><MODEL>233A</MODEL>
        <PRICE>$40.00</PRICE></PRODUCT>
    <PRODUCT><MODEL>124B</MODEL>
        <PRICE>$125.00</PRICE></PRODUCT>
</CATALOG>
```

If the tags were removed, the document would be difficult for humans to read:
233A$40.00124B$125.00

The difference is that the document representing data does not use XML mixed content. Mixed content occurs when elements and character data occur together as immediate children of the same parent element. Although mixed count is useful in documentation, it is not useful in documents that represent data, since raw data is intended for program consumption rather than for consumption by humans.

Certain properties of XML are particularly important to the present invention. These properties are also common to other markup languages. As used here and in the appended claims, a markup language is a syntax for expressing encodings such that the syntax has all of the following properties:
(1) The syntax partitions its expressions into sections comprising data and sections comprising metadata (herein referred to as 'markup').
(2) The syntax defines a structure (herein referred to as an 'element') that unambiguously collects data and markup sections into a group of sections by using markup to delimit the group from surrounding sections.
(3) The syntax defines markup that allows an expression to associate a label (herein referred to as "element type name") with any element.
(4) The syntax allows elements to nest within elements.

Web Interface Definition Language (WIDL) is an XML document type for program consumption developed by the assignee of the present application. This document type serves a number of purposes. One purpose is to provide an Interface Definition Language (IDL) expressed in XML. IDLs are well-known to the distributed computing community. They are languages for defining the signatures of program functions in a way that is independent of programming language. WIDL refers to these functions as "services." Another purpose is to implement the service described by the signature. An early version of WIDL interpreted the service as a means for programmatically interacting with a web site. When a programming language called the service, the input arguments to the service were passed as CGI query parameters to a target web site. The web site returned an HTML document, and the service implementation described how to extract data from the HTML document so that the data constituted the output arguments of the service. A program could therefore invoke the service to perform an action on a web site without requiring the program to have any knowledge of the web site or of the network protocols necessary to engage the web site.

The present assignee has developed XML RPC and a Business-to-Business Integration Server (B2B), while also enhancing WIDL to better support interaction with XML documents. XML RPC is an RPC mechanism that uses XML documents as the request and reply messages. A client machine sends a message to a server machine to ask the server machine to invoke a service. The server machine invokes the service and sends a reply message to the client. FIG. 1 illustrates the mechanism. In step 1, a client machine generates and transmits a request message to a server machine. In step 2, the server machine interprets the message as a request to invoke a service and invokes the service. In step 3, the server machine sends a reply message to the client machine. Step 3 is optional for the case where the client machine does not require a reply message.

Figure 2:
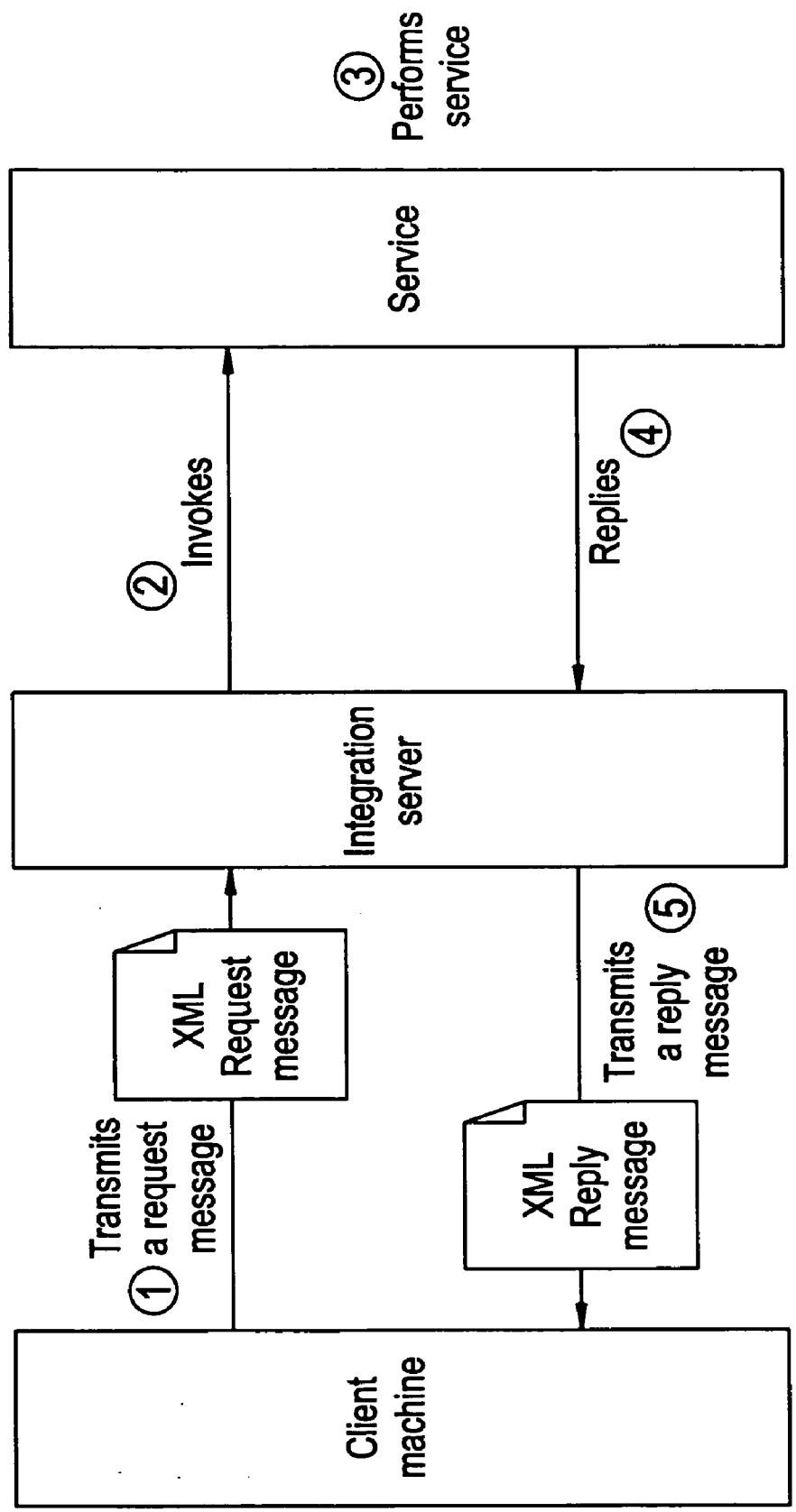
FIG. 2 is a diagram depicting the role of the an Integration Server in the XML RPC architecture.

FIG. 2 illustrates the architecture that B2B uses to implement XML RPC. In this case the server machine runs as an integration server, of which the B2B server of the present assignee is an example. The integration server interprets a request message as a request to invoke a service and invokes the service on behalf of the request message. When the service completes and provides invocation results, the integration server receives the invocation results and sends a reply message to the client machine on behalf of the service. In step 1, the client machine sends a request message to the integration server. In step 2, the integration server translates the message into a service request, formatting the service request as required by the service. In step 3, the service performs the request. In step 4, the service returns the results of the request to the integration server. In step 5, the integration server translates the results into a reply message, formatting the message as required by the client machine, and sends the reply message to the client machine.

Figure 3:
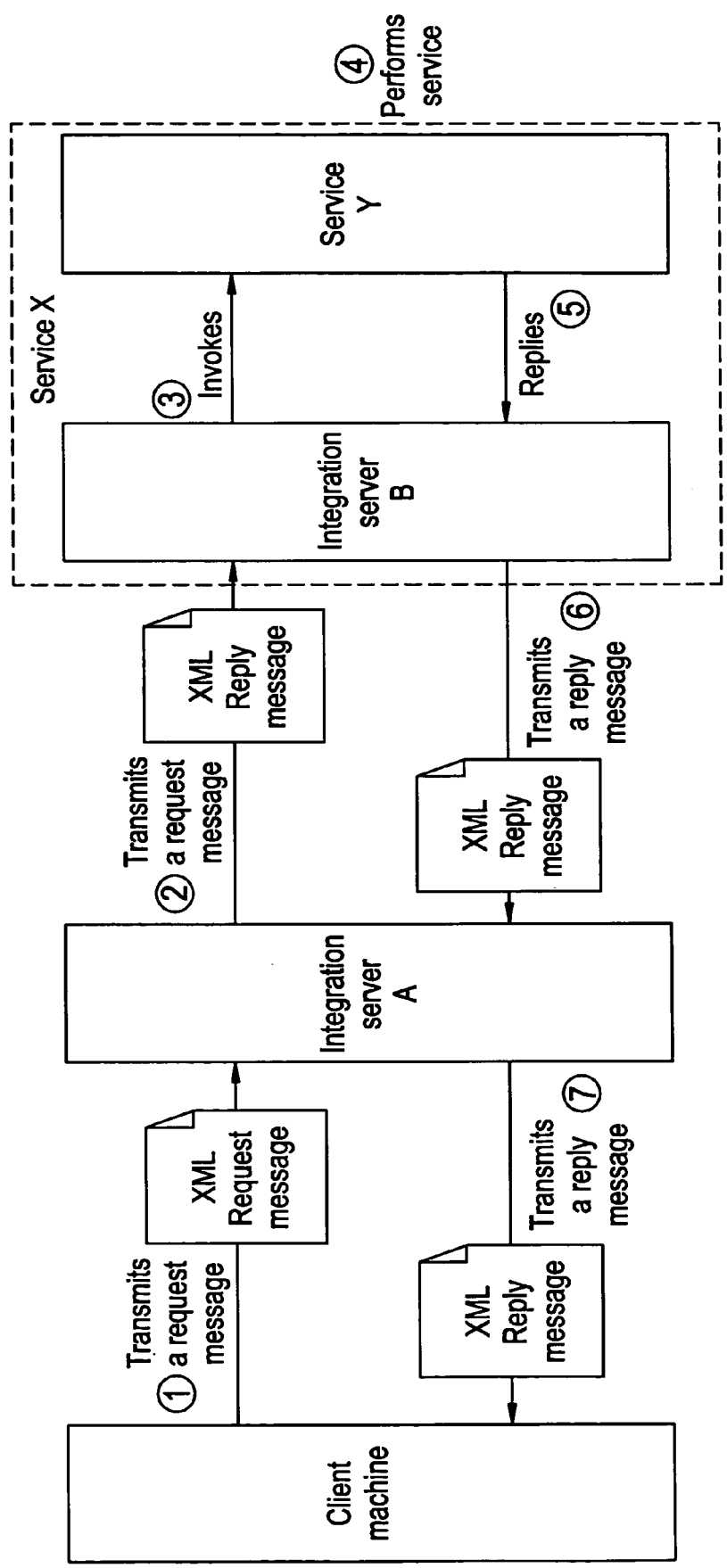
FIG. 3 is a diagram depicting a scenario in which an integration server is both a client and a server of XML RPC.

FIG. 2 portrays the integration server as the system with which the client machine communicates. An integration server may also reside on a client machine and implement the XML RPC client mechanism. B2B provides this functionality. FIG. 3 illustrates one such scenario. In this case, Integration Server B and Service Y together constitute the service that Integration Server A invokes. The diagram labels this composite service Service X. The machine on which Integration Server A resides assumes the role of the client machine. The machine on which Integration Server B resides assumes the role of the server machine. This diagram therefore depicts two integration servers engaged in XML RPC. Integration Server A passes the XML RPC request on to Integration Server B, either by passing the request message unchanged or by translating the request message into a new message having a document type that Integration Server B accepts. Integration Server B acts on the message and then sends a reply message back to Integration Server A. Integration Server A then passes the reply back to the client machine, possibly performing a translation on the message before transmitting it.

The B2B integration server provides two mechanisms for performing XML RPC. One mechanism uses programming modules called "codecs." Each codec recognizes a particular XML document type. An XML document type is also referred to as an XML-based encoding. The codec is responsible for generating an XML document from a set of arguments and for extracting a set of arguments from an XML document. Codecs are most useful with XML document types that this application later refers to as "generic" encodings. The other mechanism uses templates and WIDL. B2B uses a template to generate an XML document from a set of arguments, and it uses a binding to extract a set of arguments from an XML document. This latter mechanism is most useful with XML document types that this application later refers to as "specific" encodings. More information about codecs, templates and bindings is available later in the application.

WIDL is described in detail in Charles Allen, *WIDL: Application Integration with XML*, World Wide Web Journal, Vol. 2, Issue 4, 1997, pp. 229–248; and Mark Wales, WIDL: Interface Definition for the Web, IEEE Internet Computing, January–February 1999, Pages 55–59. A complete specification of WIDL is also found in B2B Developer User Guide, webM-DEV-U6-990311, available from the present assignee. All of these publications are incorporated by reference herein. A comprehensive description of XML RPC can be found in *The XML Handbook*, chapters 8 ("Supply Chain Integration") and 38 ("WIDL and XML RPC"), published by Prentice Hall in 1998, both of which are also incorporated by reference herein.

XML RPC

A first improvement according to the present invention is the implementation of Remote Procedure Call (RPC) using an XML-based message-encoding. XML was designed to represent documents for use in the publishing industries (including web-based publishing) and was not designed for use as the syntax of an RPC message-encoding. The present inventors have found that use of XML-based message-encodings provides many benefits, including the following:

One may design document types that are specific to a particular application or industry. Even though the encodings are not generic encodings, programs may still generically extract the data items that the messages contain, since the messages are expressed in the universally defined syntax of XML.

One may design document types that are also text-based encodings. Although every XML-based message can be loaded by any XML text editor, it is ultimately the responsibility of the designer of an encoding to ensure that the values of data items are human-readable, since it is possible to cryptically encode data in human-readable text characters. However, because the XML syntax is inherently human-readable, XML naturally biases encoding designers to ensure that the values of all data items are also human-readable.

All XML-based encodings are inherently self-describing, since XML organizes data items into named elements and into named element attributes. However, the descriptiveness of the labels varies by encoding, since it is possible for encoding designers to choose poorly differentiated names for the data items. Encodings having well-differentiated names can minimize or even eliminate the need for programs to be configured to recognize the encodings.

Figure 4:
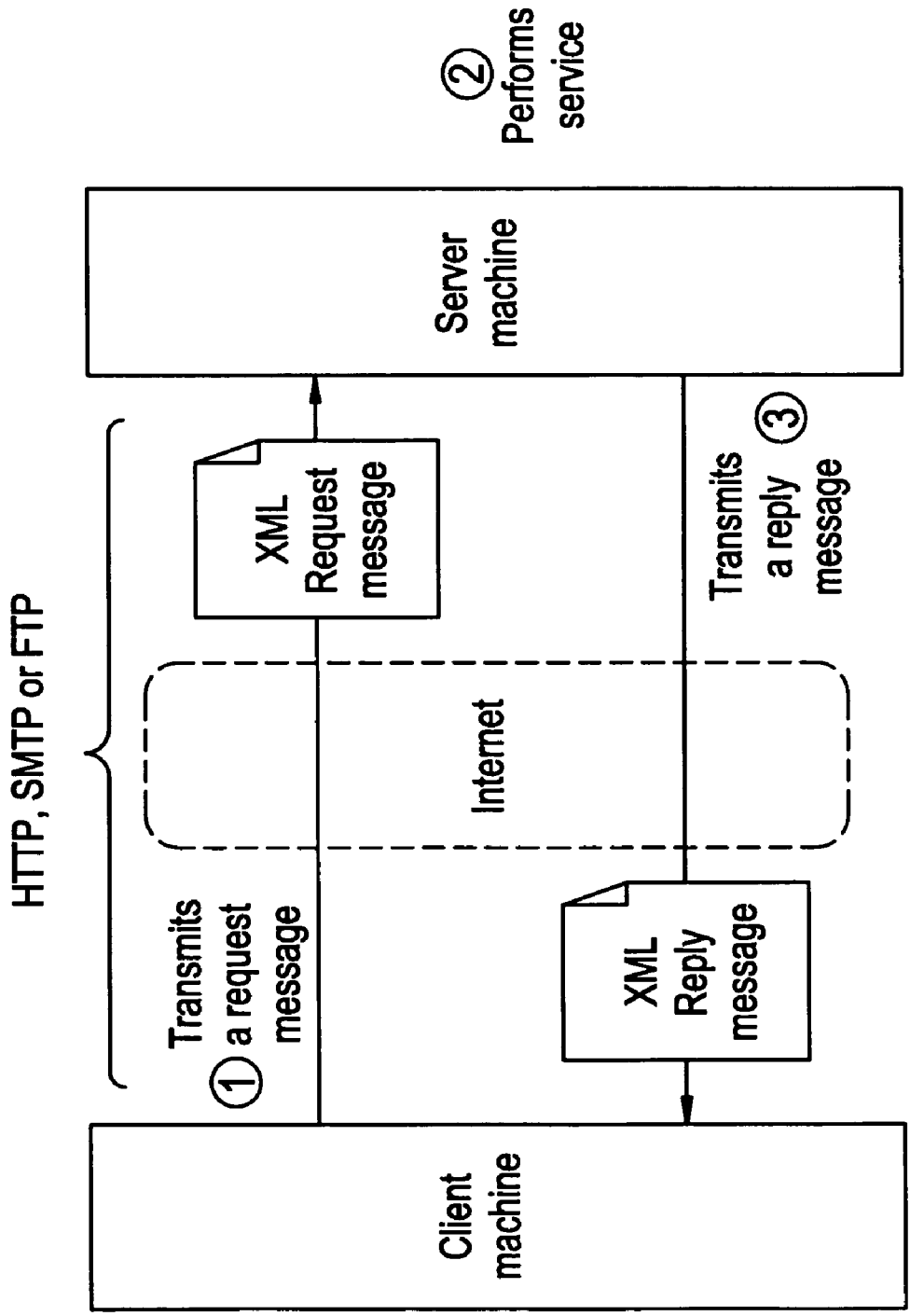
FIG. 4 is a diagram illustrating the use of XML RPC over HTTP, SMTP, and FTP.

An RPC protocol must include a transfer protocol. This application defines a transfer protocol as a mechanism for transferring messages between communicating programs. XML RPC may use any of a number of known transfer protocols, including network-specific protocols such as HTTP, SMTP, or FTP. FIG. 4 illustrates this process for the case where the transfer protocol is one of HTTP, SMTP, or FTP and the messages are transmitted across the Internet. According to the XML RPC procedure, and as depicted in step 1 of the figure, a client uses the transfer protocol to send an XML-based message to a server. This message is known as the request message. When HTTP is the transfer protocol, it is natural to accomplish this via HTTP's POST method. As shown in step 2, the server interprets the request message as a request to perform a particular service and performs the service. The server may perform this service using information found in the request message. When the service completes, the server generates a reply message. The reply message may contain information describing the results of the service. In step 3 the server then transmits the reply message to the client that initiated the request.

Implementing XML RPC over SMTP and FTP is straightforward provided that the developer synchronizes messages sent with messages received. Consider SMTP. SMTP is the Internet mail protocol, and using XML RPC over SMTP amounts to sending XML documents to servers via email and having servers send XML documents back to the client, also via email. Servers need only send a response to a request message if the request message merits a response, such as in the case where the service being invoked returns output arguments. SMTP does not guarantee the order in which messages will be delivered to a destination. Should the order of occurrence of invocation requests be important, the client will be responsible for identifying the order of invocation, and the server will be responsible for invoking the services in this order. The client must also associate reply messages received with request messages sent so that it can return the appropriate output arguments from the service that the client program invoked. Many solutions exist to this synchronization problem, as it is a common problem in network protocols.

Figure 5:
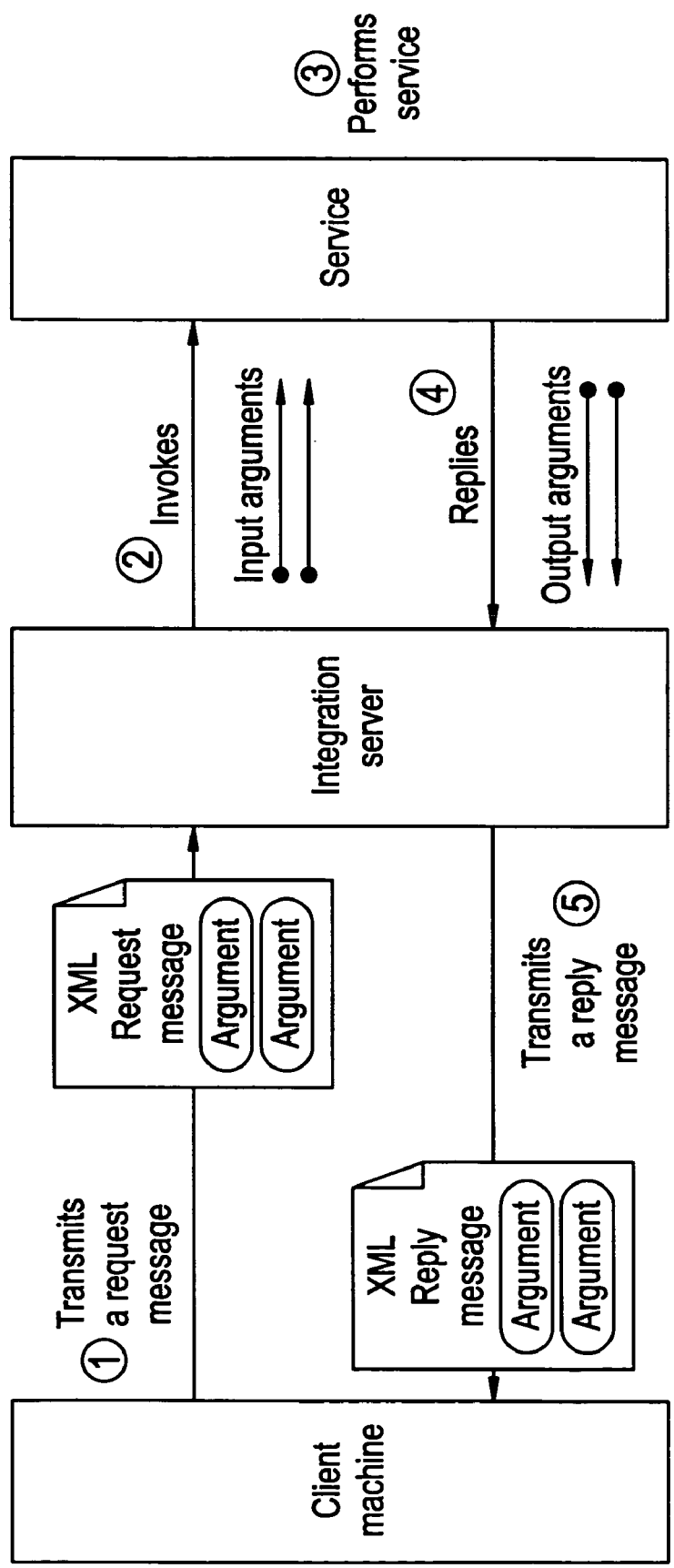
FIG. 5 is a diagram depicting the isolation of the wire protocol layer from the service layer at the server.

One way to implement the RPC mechanism is to isolate the wire protocol layer from the service layer. One may isolate these layers on the client machine, on the server machine, or on both machines. FIG. 5 depicts an implementation in which the layers are isolated on the server machine. This application uses the term "integration server" to identify the layer that sits between the client machine and the service. In step 1, the client machine generates a request message and sends it to the integration server. The request message contains a set of input arguments. In step 2, the integration server extracts the arguments from the request message and passes the arguments to a service, invoking the service in the process. As shown in step 3, the service then performs an action. The action may be based on the input arguments that the integration server provided to it. In step 4, the service completes and returns output arguments to the integration server. The integration server generates a reply message that contains the output arguments and transmits the reply message to the client machine, as shown in step 5.

Figure 6:
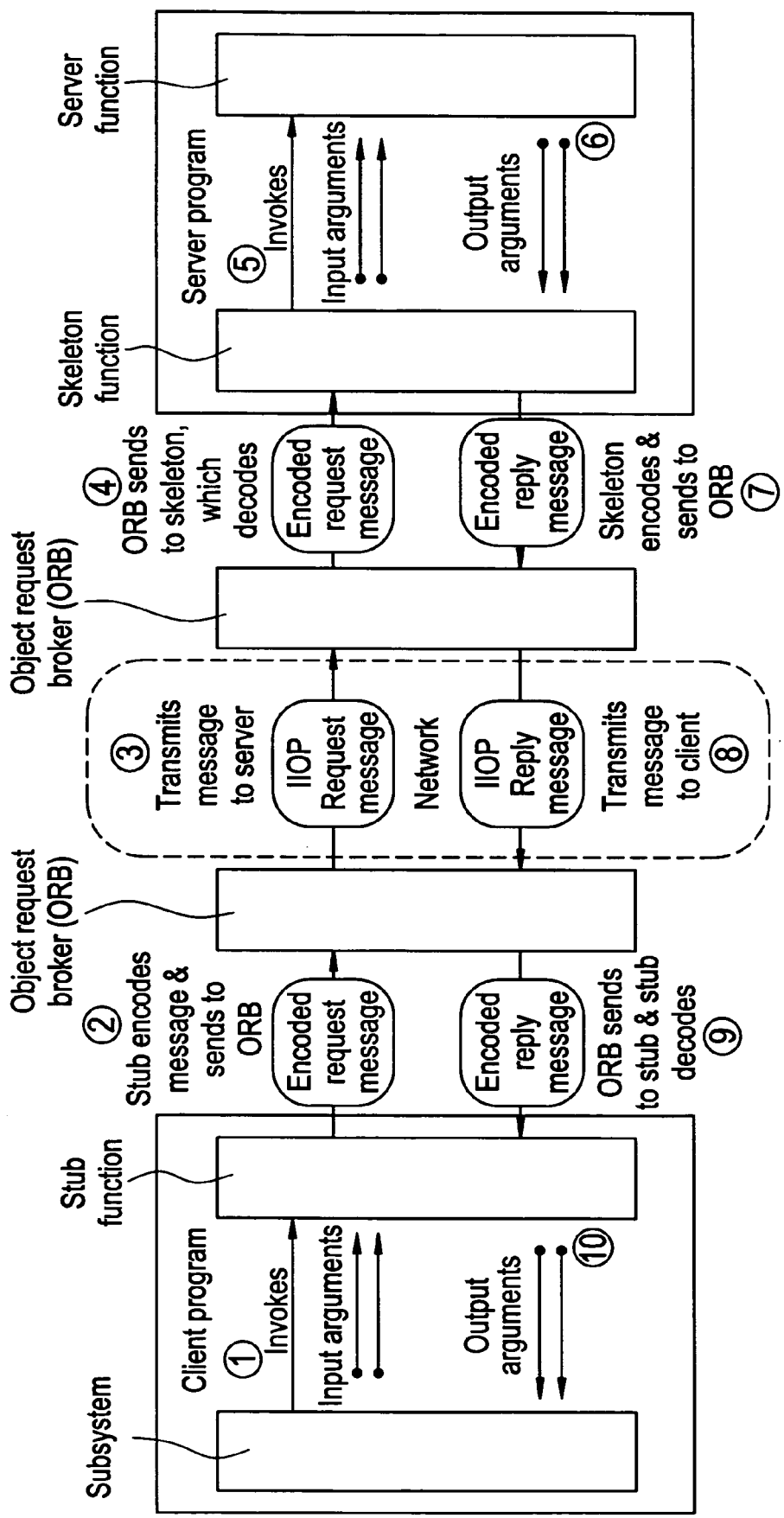
FIG. 6 is a diagram illustrating the OMG CORBA mechanism for implementing RPC.

Isolating the wire protocol layer from the service layer on the server machine provides quite a bit of flexibility. It allows an integration server to access many different kinds of services. First, consider the conventional RPC mechanism, for which we take OMG CORBA as an example. FIG. 6 portrays the mechanism by which OMG CORBA performs RPC. Here a client program and a server program are messaging via RPC. Each program is running on a machine that has an Object Request Broker (ORB) installed. The ORB is responsible for sending and receiving IIOP messages and for directing messages to the appropriate software component. CORBA defines two software components for this purpose: stubs and skeletons. A stub is a component that translates between a function signature and a message encoding on the client side, and a skeleton is a component that translates between a function signature and a message encoding on the server side.

FIG. 6 illustrates the steps of the conventional RPC mechanism. In step 1, a subsystem within the client program calls a function implemented by the stub, possibly passing input arguments to the stub. In step 2, the stub translates the input arguments into an IIOP encoding and hands the encoded arguments to the client ORB. In step 3, the client ORB sends the request message over a network using the IIOP protocol, and the server ORB receives the message. In step 4, the server ORB passes the encoded arguments to the appropriate skeleton, and the skeleton decodes the arguments. In step 5, the skeleton calls an appropriate server function, passing the arguments to the function as inputs. At this point the function executes. In step 6, the function returns output arguments to the skeleton. In step 7, the skeleton translates the output arguments into an IIOP encoding and then passes the encoded arguments to the server ORB. In step 8, the ORB sends a reply message over the network using the IIOP protocol, and the client ORB receives the message. In step 9, the client ORB passes the encoded output arguments to the stub, which decodes the arguments. Finally, in step 10 the stub function returns the output arguments to the subsystem that invoked the function.

Figure 7:
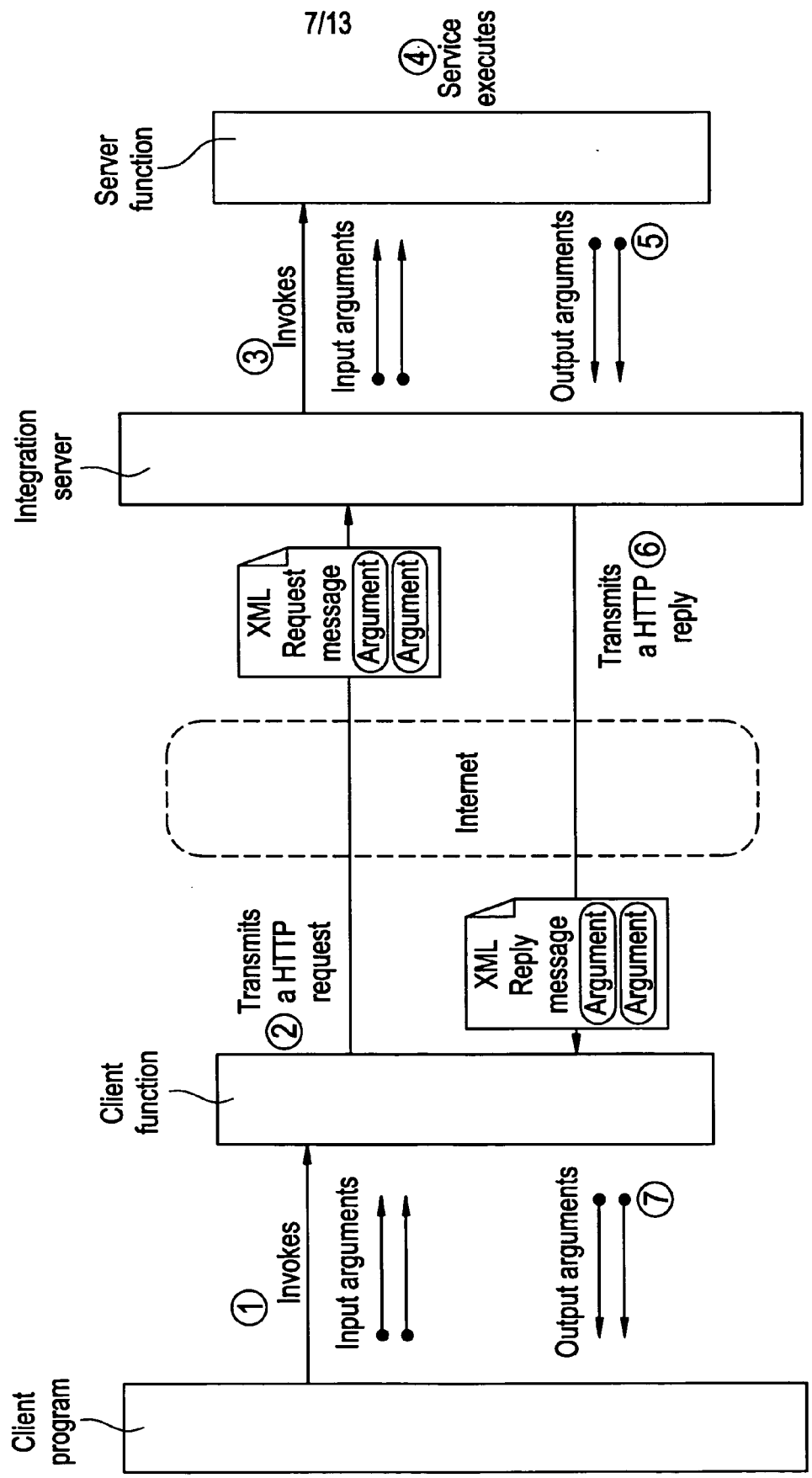
FIG. 7 is a diagram illustrating the use of XML RPC to invoke functions.

The XML RPC architecture can emulate the conventional RPC mechanism. FIG. 7 illustrates the approach. The approach does not require a client-side ORB due to the simplicity of the protocol. The client need only use the HTTP stack and an XML parser, both of which are widely available and usually free. A client wishing to use a generic document type might utilize a utility component for this purpose, such as the codec module described below. Clients using custom document types would not need such a module. The XML RPC architecture also does not require a server skeleton. Type labels and semantic labels in the XML messages may provide the server with all of the information that the server needs to decode the message. Some XML message encodings may not provide all of the necessary information. Provided that the encodings semantically label the data items they express, it is possible to configure the server to handle these encodings using declarative mechanisms such as WIDL bindings.

The steps are a subset of the steps that CORBA IIOP requires. In step 1, the client program invokes a client function, possibly passing input arguments to the function. This step is not strictly necessary, since the simplicity of the protocol would allow the client program to itself perform the task. However, continuing the comparison with the conventional RPC mechanism, in step 2 the client function generates an XML request message from these arguments and transmits the message to the integration server. The diagram illustrates the use of HTTP to perform the transmission, but any transfer protocol will suffice. In step 3, the integration server automatically decodes the message and invokes a server function, passing the arguments as inputs to the function. As shown in step 4, when the server function completes, the integration server receives the output arguments. In step 5, the integration server automatically generates an XML reply message from the output arguments and sends this message to the client. In step 6, the client extracts the output arguments from the message and returns them to the client program that invoked the client function.

Figure 8:
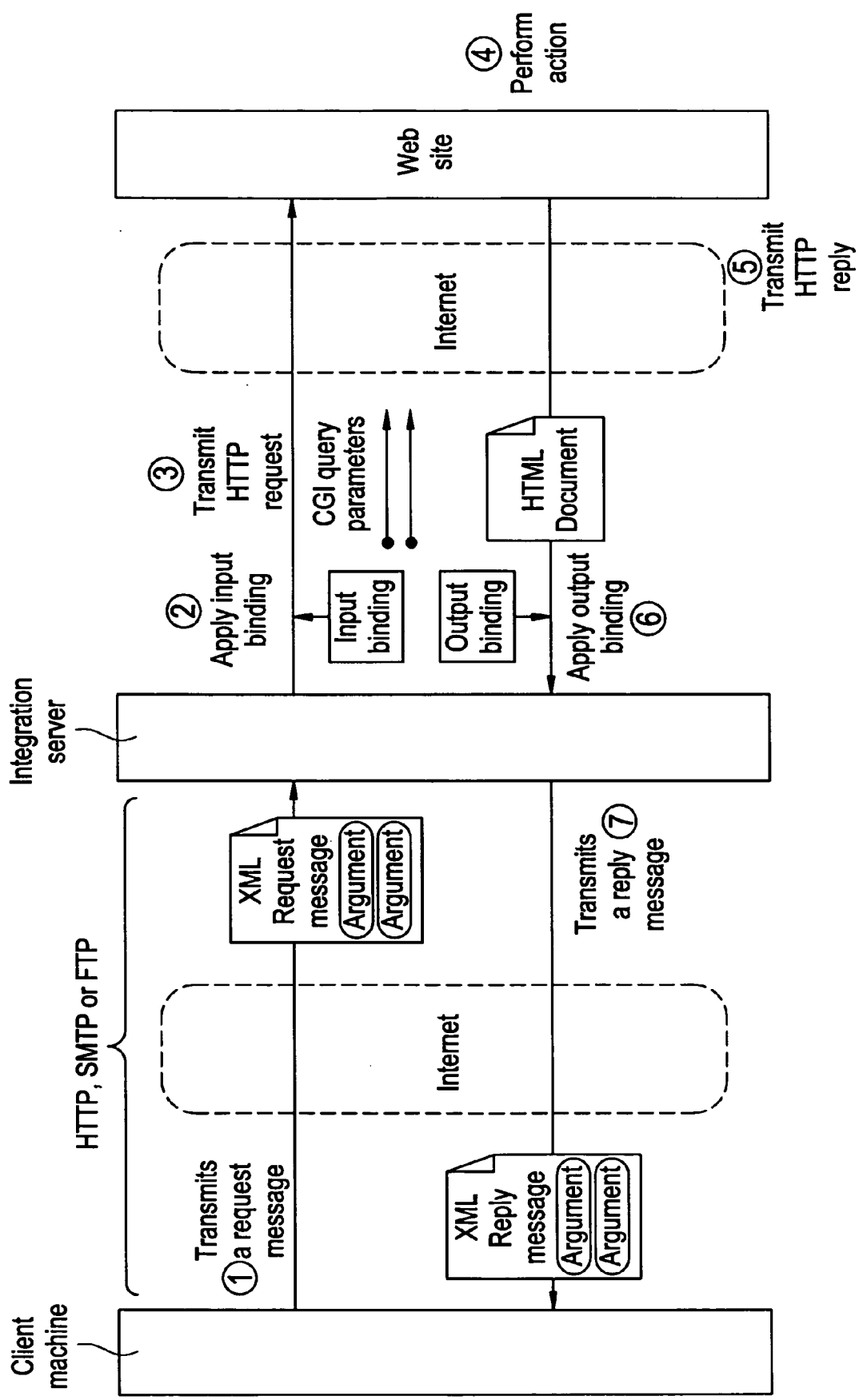
FIG. 8 is a diagram illustrating the use of XML RPC to invoke a web site service.

FIG. 8 illustrates the flexibility that an XML RPC solution allows. The previous example illustrating using XML RPC to invoke a server function. This example illustrates a case where the mechanism is invoking a service that is not a function. Here a web site is behaving as a service. One may view a web site as a service amenable to automated access even though web sites were intended for browser access. In a browser one may fill out a form, press a button to submit the form parameters to a server, and then get an HTML page back. The values entered into the form may be thought of as input parameters, the button may be thought of as the means by which a service is identified, and the HTML page may be thought of as a collection of output parameters. It is therefore possible for software to wrap a web site so that it looks like a function call. WIDL allows one to accomplish this. Given that a web site may be viewed as a service, given that XML RPC is a mechanism by which one may invoke a remote service, and given the self-describing properties available to an XML-based encoding, one may use XML RPC to invoke web services.

In step 1 of FIG. 8, a client machine transmits an XML request message to an integration server, where the request message containing a set of input arguments. The integration server extracts the input arguments from the message via one of the mechanisms specified later in this specification. In step 2, the integration server applies a WIDL input binding to these arguments to prepare an HTTP request. The input binding may select from the input data items provided in the XML request message since the integration server may preserve the self-describing properties of these data items. In step 3, the input binding embodies the input arguments as standard CGI (common gateway interface) query parameters and submits the parameters to the web server. In step 4, the web server performs some action in response to these parameters, such as updating a database or retrieving information from a database. In step 5, the web server replies with an HTML document, sending the document back to the integration server via HTTP. In step 6, the integration server applies a WIDL output binding to the HTML document to extract output parameters from the document. In step 7, the integration server generates an XML reply message containing the output parameters and sends the reply message to the client machine. The client machine has therefore transmitted an XML request message, invoked a web site service, and received an XML response message.

Figure 9:
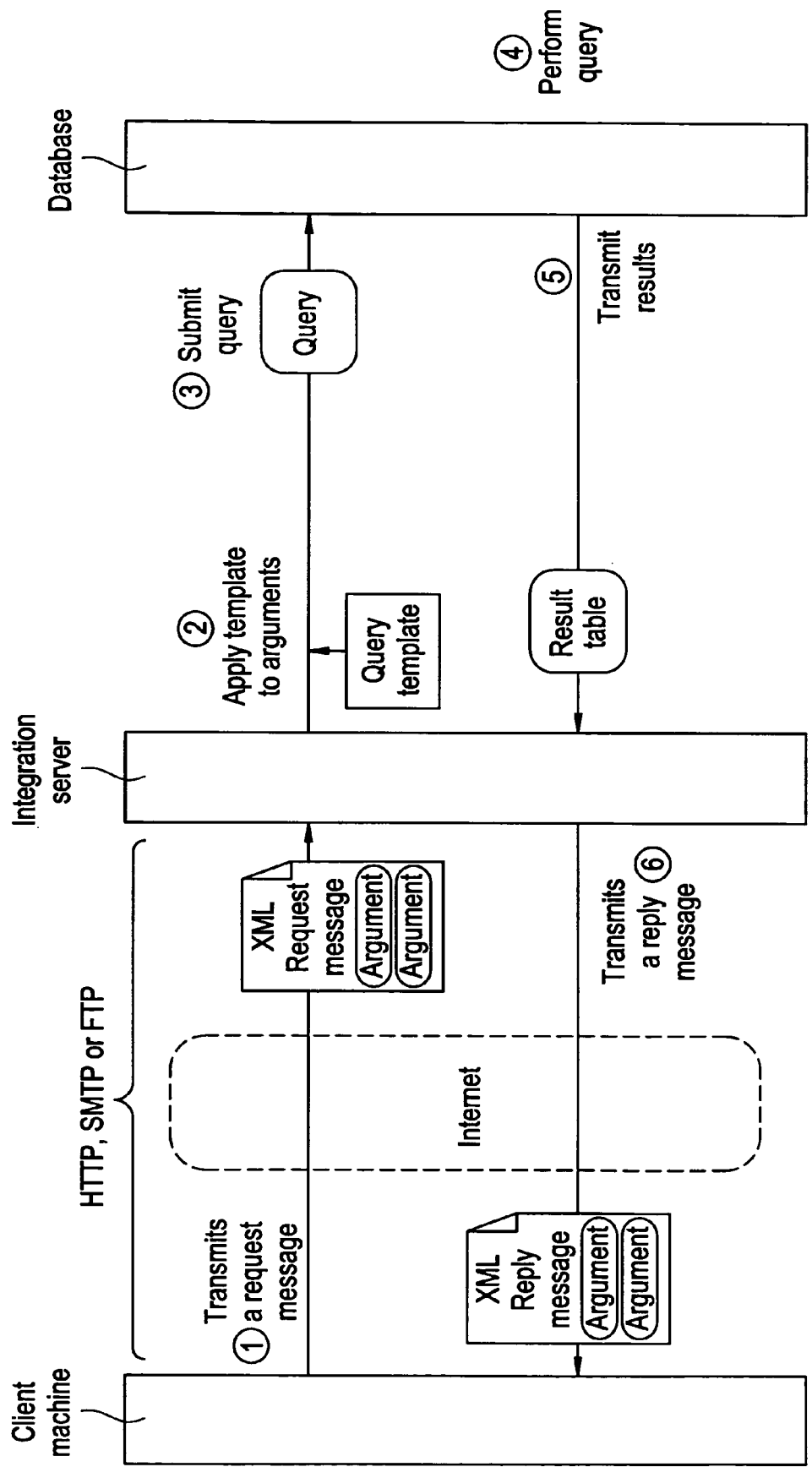
FIG. 9 is a diagram illustrating the use of XML RPC to invoke a database operation.

FIG. 9 portrays another use of XML RPC to invoke a service that is not a function. In this case the service is a database query. In step 1, the client machine generates and transmits an XML-based request message to the integration server. The integration server extracts arguments from the request message. In step 2, the integration server applies a query template to the arguments to generate a query (such as an SQL query) from the arguments. For example, the query template might appear as follows:

SELECT TITLE, SALARY FROM EMPLOYEES
    WHERE YEARHIRED <= % year %

If the XML request message contains a data item whose semantic label is "year", and if the data item has a value of "1997", then the resulting query is as follows:

SELECT TITLE, SALARY FROM EMPLOYEES
    WHERE YEARHIRED <= 1997

In step 3, the integration server submits this query to the database for execute. In step 4, the database executes the query. In step 5, the database returns the results of the query.

The results usually take the form of a table. In step 6, the integration server generates an XML reply message that expresses the results of the query and sends the reply message to the client machine. Hence, the integration server has used the self-describing properties of an XML request message to perform a database query without having to first invoke a function that has been specifically implemented to perform the query. A database query is therefore an example of a service that is not a function.

To use XML RPC to invoke a service, the client machine must identify the service that the request message is intended to invoke. There are two basic ways to accomplish this. Transfer protocols require that the client provide both a destination indicator and a message at the time the client sends the message to a server. One way to identify the target service is to identify the service within the destination indicator. For example, if the transfer protocol is HTTP, the URL (also known as the URI) serves as the destination indicator. In addition to naming the host server, as URLs conventionally do, the URL would also name the service that the client intends to invoke. The following URL illustrates how one may invoke a service named "DoSomething" on the webMethods B2B Integration Server:

http://b2b.companyX.com/invoke/interfaceY/DoSomething

In this example, "b2b.companyX.com" identifies the server that hosts the service, "invoke" informs the server that the server is to invoke a service, "interfaceY" identifies the group of services to which the service belongs, and "DoSomething" identifies the name of the service to invoke from this group.

Another way to identify the target service is to do so within the request message. Since the request message is in XML, there are as many ways to identify the service within the message as there are ways to embed information in an XML document. For example, one might name the target service either in an attribute value or in the content of an element. When the message identifies the target service, the destination identifier need not also do so. The following XML message illustrates identifying the target service within an element attribute:

<RPC-REQUEST SERVICE="DoSomething">
      <!-- body of the request message --!>
   </RPC-REQUEST>

Still another way to accomplish this is to use the element type name of the root element to identify the service, as illustrated in the following example:

<DoSomething>
      <!-- body of the request message --!>
   </DoSomething>

In addition to identifying the target service, the client must create the request message (possibly inserting the target service name into the request message). The conventional RPC mechanism uses stub code to accomplish this. The stub is hard-coded to produce the message that is associated with each function or class-method. A developer generally uses an IDL compiler to generate this code. When the client generates an XML-based RPC message, another option is available to the client: the client may use a template to generate the request message. A template may take any of a variety of forms. In this case, it may take the form of the XML document that is to be generated, except for placeholders within the template that specify where the data items of the service's output arguments are to be placed within the document. An example template follows:

```
<PurchaseOrder>
    <Account>%value acct%</Account>
    %loop line-items%
        <LineItem>
            <Model>%value model%</Model>
            <Quantity>%value quantity%</Quantity>
        </LineItem>
    %endloop%
</PurchaseOrder>
```

In this example, the template generates a specific XML-based RPC message that represents a purchase order. The '%' symbol delimits placeholders. The placeholders that begin with "% value" name data items that are to be inserted into the document. In the case of "% value acct %" the data item "acct" is the name of an input argument that was provided to the service or function. The "% loop" placeholder identifies a data item that contains a set of data items. The template repeats the contents between the "% loop" and the "% endloop %" placeholders one for each value in this data item. The "% value" placeholders in this data item each name a data item that occurs within a value of the set identified by "% loop". Hence, in this example, the "line-item" data item is a set of data items such that each data item in the set contains both a data item labeled "model" and a data item labeled "quantity".

When the server receives an XML-based RPC request message from the client, the server must identify the target service and it must convert the data items of the request message into a form that is suitable for the target service. If the request message names the target service, the server must first determine the message's document type so that it knows which data item contains the target service. The server must also translate the request message into the arguments that it is to deliver to the target service. The translation mechanism that the server uses may depend on the document type in which the message is expressed.

There are a variety of approaches to determining a message's document type. Several approaches follow:

XML allows a document to identify its document type in the optional document type declaration (DTD) that may appear within the document. The DTD has an optional system identifier and an optional public identifier. These identifiers contain URLs (or URIs) that uniquely identify the document type within the space of all document types. The server could parse the XML message and then extract the document type from the DTD. The XML specification explains this use of the system and public document type identifiers.

A parameter of the transfer protocol could identify the document type. For example, an HTTP request could identify the document type in an HTTP header variable. The target URL (or URI) might itself identify the document type.

The element type name of the root element could identify the document type. The server would be configured to associate element type names with the particular document types.

The server could be hard-coded or configured to accept only messages expressed in a particular document type. This approach would be most useful in servers that used generic encodings, since a single generic encoding (that is, a single document type) would be able to represent any RPC request or reply message.

The service being invoked might be configured to accept only messages of a particular document type. This approach cannot be used with document types that assume responsibility for identifying the service, since the service must be known before the document type can be determined.

The present invention contemplates expressing each XML-based message-encoding as either a generic encoding or a specific encoding. Hybrid encodings are possible, but if any portion of a message is application-specific or industry-specific, the message is itself necessarily application-specific or industry-specific. A generic XML-based encoding uses element type names and attribute names (the labels) to describe the data structures and the data types to which the data items conform. The server uses this information to build the data structures that a generic message depicts. The following XML documents illustrate request and reply messages that are expressed in an XML-based generic encoding:

```
<RPC TYPE="REQUEST">
    <VALUE NAME="accountID" TYPE="int">2001</VALUE>
    <VALUE NAME="zodiacSign">Aquarius</VALUE>
</RPC>
<RPC TYPE="REPLY">
    <VALUE NAME="orderNumber" TYPE="int">38553</VALUE>
    <VALUE NAME="fortune">XML is good for RPC</VALUE>
    <VALUE NAME="balance" TYPE="float">65.00</VALUE>
</RPC>
```

These messages provide a name attribute for every data item. The name attribute associates a semantic label with the data item. The remaining element type names and attributes provide data structure and type information. The messages might also have been expressed in an encoding that lacks the name attributes (or for which the name attributes are optional). Programs using messages expressed in such an encoding would only be able to construct the data structures represented in the messages and would not be able to distinguish among and selectively process the data items without being configured or hard-coded with semantic information about the data items. Thus, it is beneficial for a generic XML-based encoding to include not only labels that provide the data structures and data types of the data items, but to also include labels that semantically label the data items. Absent the semantic labels provided by the name attributes shown in the preceding example messages, the messages would be expressed as follows:

```
<RPC TYPE="REQUEST">
    <VALUE TYPE="int">2001</VALUE>
    <VALUE>Aquarius</VALUE>
</RPC>
<RPC TYPE="REPLY">
    <VALUE TYPE="int">38553</VALUE>
    <VALUE>XML is good for RPC</VALUE>
    <VALUE TYPE="float">65.00</VALUE>
</RPC>
```

Many other XML-based generic encodings are possible. As previously explained IIOP and DCE are already using generic encodings for RPC. XML-based generic encodings according to this invention are unique for the many reasons that have already been ascribed to the class of XML-based messages. However, they are especially unique because unlike IIOP and DCE messages, XML-based messages according to this invention are self-describing and therefore acquire all of the benefits that this application has ascribed to self-describing encodings. In particular, because XML-based generic encodings provide data structure and type information for the individual data items, a client can invoke a remote service on a server without configuring or hard-coding the server to recognize the message types that are specific to that service. The messages themselves contain all of the information necessary to decode the data found in the message into the arguments that the service requires, since the message itself describes the data structures of the arguments.

Notice that it is not necessary for the in-memory representation the client uses for these arguments to be the same representation into which the server reconstructs the arguments, since the server and client platforms may have different representational requirements, and since some data structures have multiple equivalent representations. For example, a client written in the C programming language might represent an array of records (C struct types) as a contiguous sequence of records, while a server written in the Java programming language might represent an array of records as an array of pointers (object references) to records that have been allocated in a possibly non-contiguous manner. Middleware on the server computer would assume responsibility for receiving the message and for converting the message into the representation required by the service being invoked, since the client generally will not (and generally should not) convey information about either a server's platform-specific requirements or a service's language-specific requirements.

A specific XML-based encoding uses element type names and attribute names (the labels) to label the data items according to the semantics that the data items have in the associated application or industry. A specific encoding might also use type labels, but because some of the labels are meaningful only to a particular application or industry, the encoding is not considered to be a generic encoding. The following examples are specific encodings of the above generically encoded messages:

```
<FORTUNE-REQUEST>
    <accountID>2001</accountID>
    <zodiacSign>Aquarius</zodiacSign>
</FORTUNE-REQUEST>
<FORTUNE-RECEIPT>
    <orderNumber>38553</orderNumber>
    <fortune>XML is good for RPC</fortune>
    <balance>65.00</balance>
</FORTUNE-RECEIPT>
```

Note that the message contains no type labels, which prevents a server that receives the message from being able to construct the corresponding data structure unless the server is pre-configured or hard-coded with knowledge of this data structure. For example, without knowing in advance that the contents of the 'orderNumber' element is always an integer, the server would have to represent the contents as a string.

There are many ways in which to express equivalent specific encodings. For example, a data item that occurs as the character data content of an element might instead occur as the value of an attribute, or a data item that occurs as a child of one element type might instead occur as a child of another element type. Data items might also assume different element type names or attribute names in different but equivalent encodings. This flexibility is the primary asset of specific encodings, since it allows people to define encodings that are specific to an application or an industry. An encoding may be designed so that messages expressed in the encoding are readable, writable, and modifiable by industry experts who may not also be software development experts. Such encodings may be designed to directly and succinctly portray the data structures with which the industry experts are familiar.

Implementing RPC using a generic encoding requires certain changes. The W3C provides a standard known as DOM (Document Object Model). DOM is an API for accessing the contents of HTML and XML documents. Many parsers exist that will parse an XML document into a data structure that is navigable via the DOM API. To implement a generic encoding a software developer need only use this API to navigate a generically encoded XML document and to build the data structures identified by the labels found in the document. This application refers to the code that implements this mechanism as a 'codec.' The name derives from a codec's responsibility for encoding and decoding the XML RPC messages.

Figure 10:
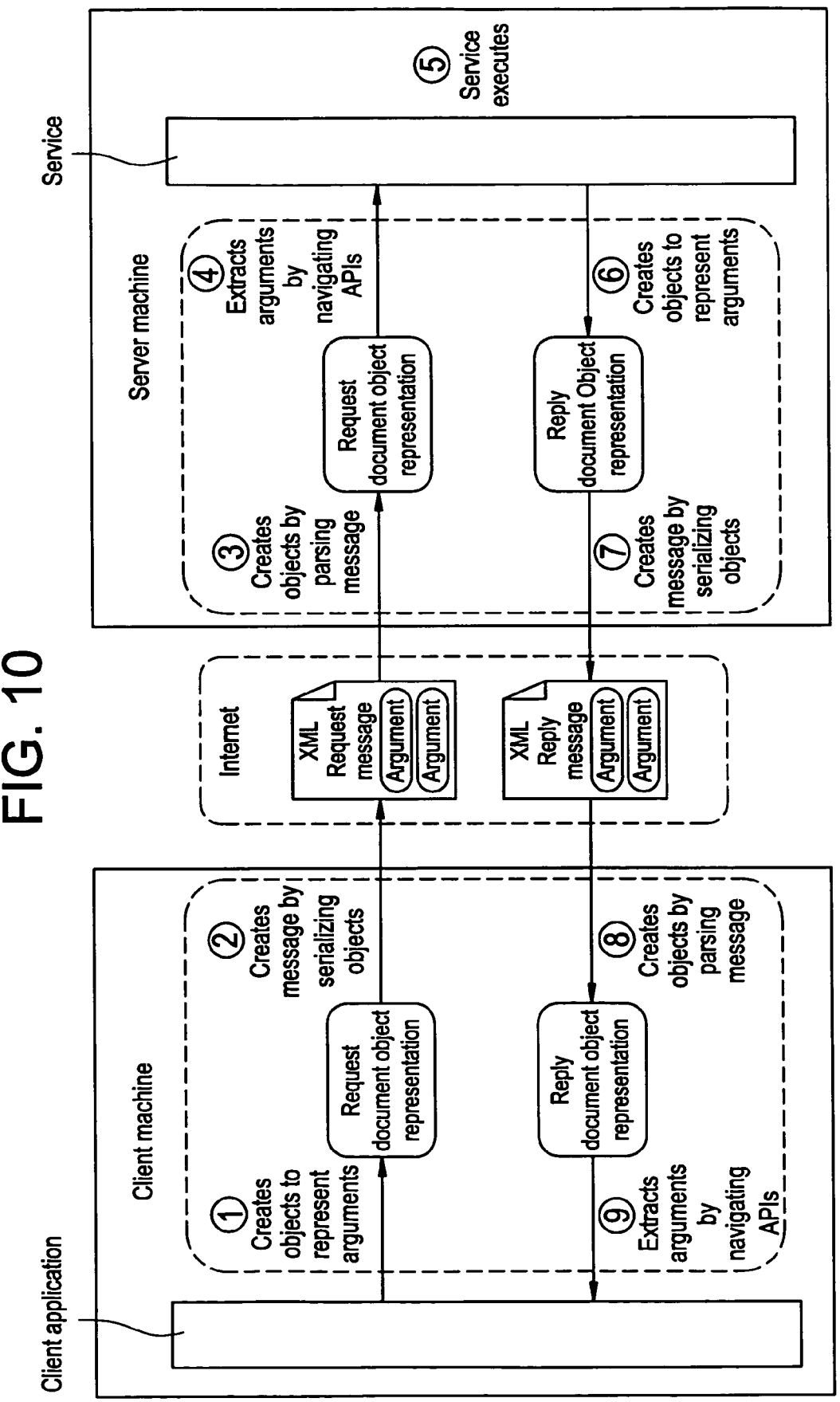
FIG. 10 is a diagram illustrating the use of codecs to implement XML RPC.

In an architecture that uses codecs, codecs need only be responsible for converting a set of arguments into a message and for extracting a set of arguments from a message. Codecs need not be responsible for transmitting and receiving these messages. FIG. 10 provides a logical view of an architecture that uses codecs. The diagram depicts the steps involved in sending and receiving messages that are encoded and decoded by codecs on both the client and server machines. Steps 1 and 2 together comprise a unit whereby a codec generates a message from a set of arguments. In this case the arguments are the input arguments of the request. In step 1, the codec generates an internal representation of the XML request message from the arguments. One might use the W3C DOM APIs to encapsulate this representation. In step 2, the codec generates a serialized representation of the message. The serialized representation is expressed in the syntax of XML and is suitable for transmission between machines. When the client application wishes to invoke a service via XML RPC, the client machine utilizes the appropriate codec to generate the message and then transmits the message to the server machine.

Steps 3 and 4 together comprise the reverse codec operation. Here a codec extracts a set of arguments from a provided XML message. In this case the arguments are input arguments. In step 3, the client machine hands the codec an XML message. The codec parses the message to generate an internal representation of the message. In step 4, the codec navigates this representation to extract the arguments from the message. If the representation exposes itself through DOM APIs, then the codec navigates the DOM APIs to gather this information. The resulting arguments are suitable for use by a programming language function.

Steps 5 and 6 together perform the same operation as steps 1 and 2, except that in this case the client machine is asking the codec to create an XML message containing output arguments. Likewise, steps 7 and 8 perform the same operation as steps 3 and 4, except that the client machine is asking the codec to extract output arguments from the message. Because the operations are symmetrical, the same codec may be used on both the client and the server. The net result is that a client application encodes and transmits encoded arguments to a server application, which decodes the arguments and invokes a service using the arguments as inputs. When the service completes, the server application encodes the service's output arguments and transmits the encoded output arguments to the client application, which then decodes and utilizes the output arguments.

A codec must be able to generate an XML message from a set of input arguments. This requires that the codec acquire knowledge of the type structures of the arguments. It is easiest to imagine implementing the encoding procedure for languages that provide run-time type information, such as C++, Java, and Smalltalk. The codec need only examine the type information that the language associates with the arguments and use string concatenation to build the reply XML message in accordance with this type information. Implementing the encoding procedure for other languages requires the type information to be configured or hard-coded in either the codec or the software that asks the codec to perform the encoding. Conventional RPC mechanisms use the configuring or hardcoding approach. A service could provide the type information for its input and output arguments via an interface repository (abbreviated 'IR' in the OMG CORBA terminology).

There are several approaches to implementing XML-based specific encodings. One approach is analogous to the implementation of generic encodings. Just as for generic encodings in which one writes a codec that is specifically designed to recognize and generate the particular generic encoding, in this approach to implementing specific encodings, one writes a codec that is hard-coded to recognize and generate a particular specific encoding. As with the implementation of generic encodings, one could use the DOM APIs and run-time type information to accomplish this. This approach has the drawback that distinct specific encodings require distinct software code, which generally inclines developers to write software to process only a single encoding or a small number of encodings.

In another approach to implementing XML-based specific encodings, a single implementation is capable of processing any encoding that it is configured to recognize. The approach may also be used to implement generic encodings, although the approach requires that the implementation be configured to recognize each particular kind of message that will be expressed in the generic encoding. In generic encodings, the kind of message varies according to the data structures that are represented in the different messages. This approach requires the use of binding technology that the inventors have defined, and which is described in more detail in the publications cited above herein.

Figure 11:
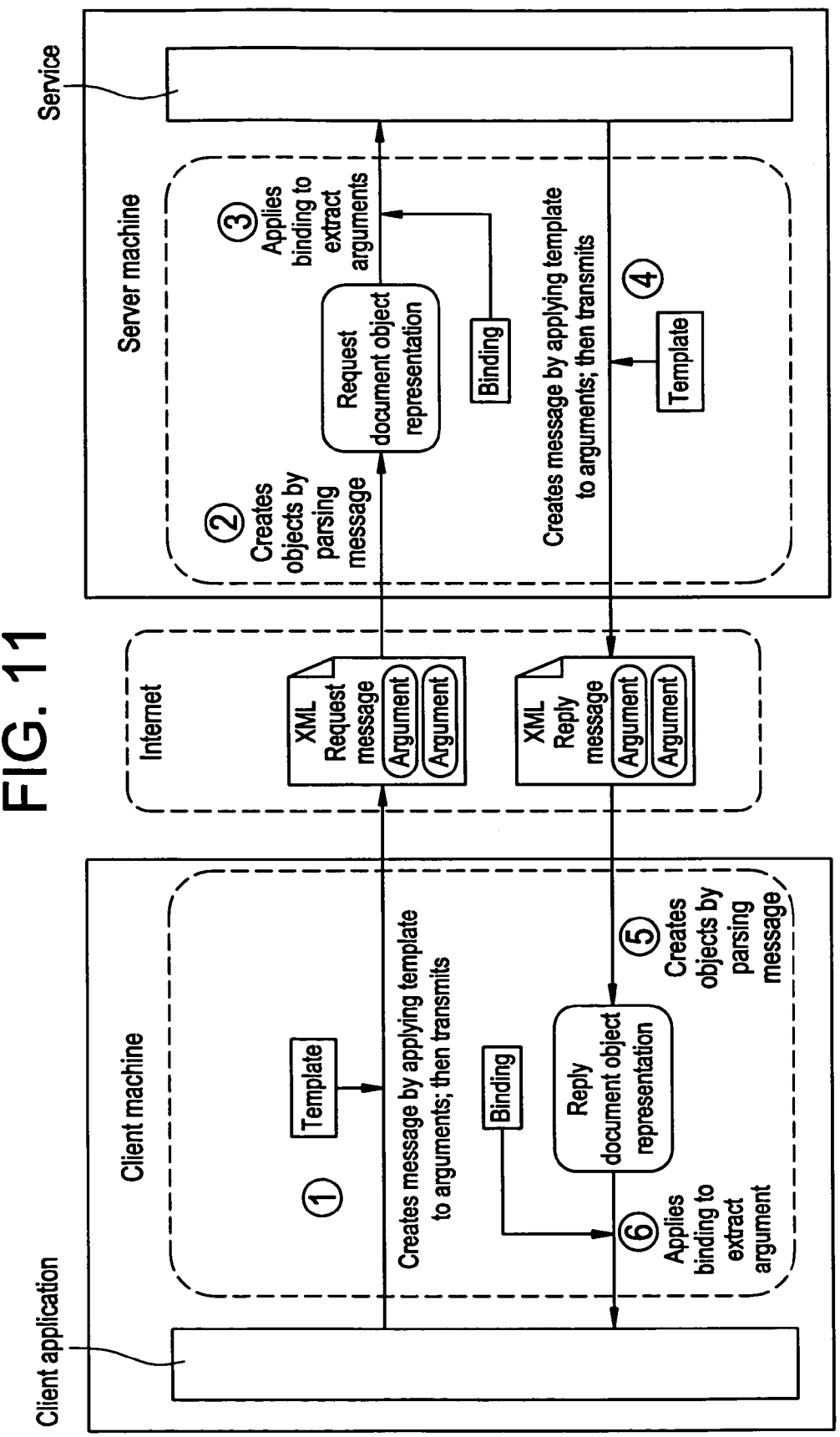
FIG. 11 is a diagram illustrating the use of templates and bindings to implement XML RPC.

FIG. 11 depicts the architecture of the binding approach to implementing XML-based specific encodings. The approach distinguishes client behavior from server behavior. The client machine may implement the client behavior regardless of the server implementation, and the server machine may implement the server behavior regardless of the client implementation. The figure depicts a scenario in which both client machine and server machine exhibit binding behavior. In step 1, the client application applies a template to a set of input arguments. According to the example, the result is an XML request message. The client machine transmits this message to the server machine. In step 2, the server machine parses the XML message into an internal representation. In step 3, the server applies a binding to this internal representation to yield a set of input arguments and then invokes a service with these input arguments. In step 4, the service completes and returns a set of output arguments. The server machine applies a template to these output arguments to generate an XML reply message and then transmits this message to the client machine. In step 5, the client machine parses the reply message into an internal representation. In step 6, the client machine applies a binding to this internal representation to yield a set of output arguments. These output arguments are returned to the application as output arguments of the invoked service.

Figure 12:
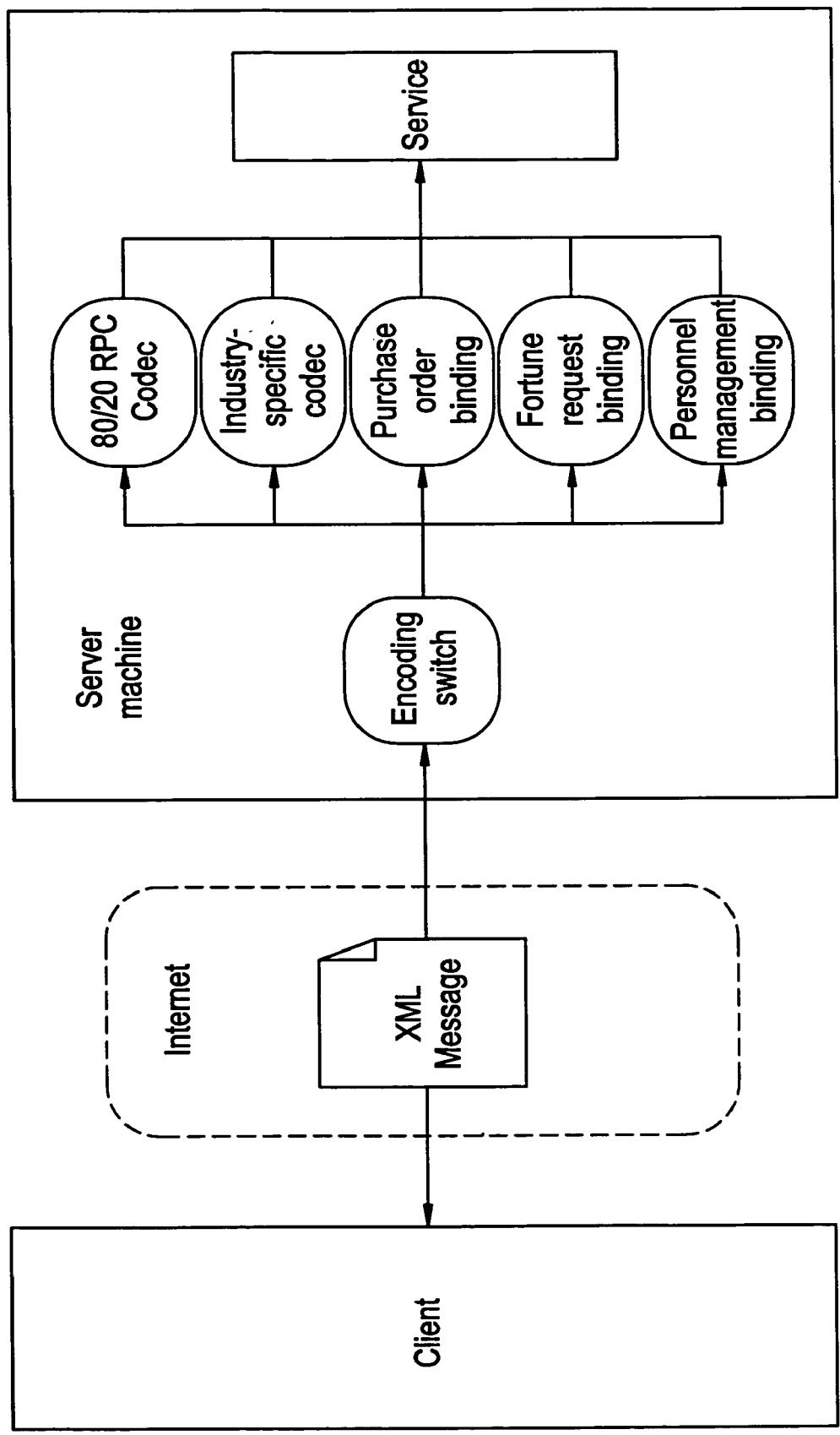
FIG. 12 is a diagram depicting the architecture of a program that is capable of supporting XML RPC messages expressed in a variety of encodings.
Figure 13:
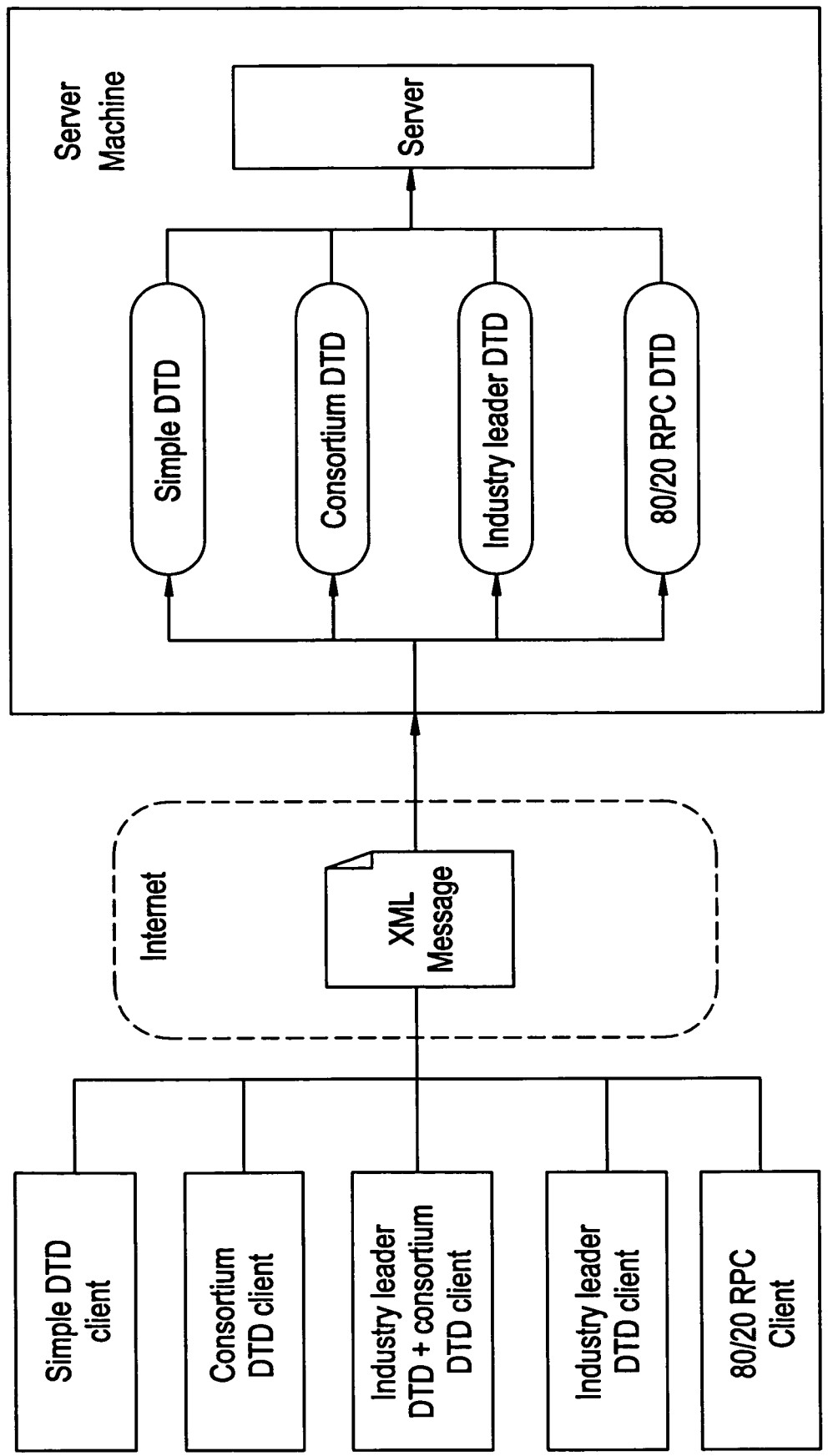
FIG. 13 is a diagram depicting the benefits of the architecture shown in FIG. 12.

The integration server is capable of associating each encoding with a particular codec or binding. (The server can also accomplish this by associating each service with a particular codec or binding or by allowing each service to select the codec or binding that applies.) FIG. 12 depicts this facility. When the server receives a request message, it applies the appropriate codec or binding to the message to extract the input arguments from the message. The server then invokes the service using these data structures as arguments. When the service completes and returns output arguments, the server applies a template to these output arguments to generate the XML message that is to be returned to the client. A program that implements this architecture is capable of servicing XML RPC messages expressed in a variety of encodings. FIG. 13 illustrates the architecture's benefits. Client applications can be written to use different message encodings. The integration server is capable of invoking the same service in response to receiving messages expressed in any of these encodings. One service becomes available to a variety of clients designed for use with differing XML document types.

This application has so far described two mechanisms for generating XML-based RPC messages. One is to use program code that is specifically designed to generate only a particular encoding. Another is to use the template mechanism. The approaches are applicable to both generating request messages on the client side and to generating reply messages on the server side. This application has also described two mechanisms for extracting data items from XML-based RPC messages. One is to use a codec that is specifically designed to extract data items for a particular encoding. This is the mechanism that is most suitable for implementation based on XML APIs such as the W3C DOM API. The other is to use the binding mechanism, the detailed description of which has been left to documents that are included above in this application by reference. The approaches for extracting data items are applicable both to receiving request messages on the server side and to receiving reply messages on the client side. Hence, several techniques have been described by which one may implement XML RPC.

The present inventors have identified a simplification to the RPC mechanism that may be applied to any kind of encoding, including both specific and generic XML-based encodings. Conventional implementations of RPC middleware use code known as stubs or skeletons to translate between the middleware-specific representation of a message and the function signature required by the service. Conventionally, if a message includes three distinct record arguments that are to be input to the service, the service's signature may have three distinct record arguments. The following Java code illustrates such a service signature:

EmployeeID addEmployee(Name n, Address a, JobType t)

In a conventional middleware solution, a developer would use a tool known as an Interface Definition Language (IDL) compiler to generate stub or skeleton code that invokes this service by parceling out the individual message arguments into individual service arguments. The same stub or skeleton code would be responsible for converting the output EmployeeID argument into a data item of the reply message.

The present inventors contemplate the simplification whereby all services have the same signature except for possibly the name of the service. This signature would take as input a single software object that contains all of the input data items and would return as output a single software object that contains all of the output arguments. The inventors have defined an object known as a Values object for this purpose. A Values object is a hash table of named software objects where the object names serve as the hash table keys. The object names serve both as the key by which the objects are hashed and as labels for the software objects. The object names may actually be labels found in the message, but they need not be so. The objects of the hash table may represent lexical types such as integers, floats, and strings. They may also represent structured objects such as arrays, lists of arbitrary objects, and records. Records may be represented within a Values object as another Values object. Values objects are well-suited for representing records, since records uniquely name their constituent fields, making them good hash keys.

The Values object serves as the single input object of a service and as the single output object of a service. The previous example service could then be expressed as follows:

Values addEmployee(Values inputs)

The Values object provided as an argument would contain at least three objects—one object for each of Name, Address, and JobType. However, the Values object would represent the Name, Address, and JobType structures as nested Values objects. That is, a Values object may represent records internally as other values objects. The fields that comprise the Name, Address, and JobType structures would then each occur as an entry in the associated nested Values object. The service may but need not return the Values object instance that is provided as an input argument.

This simplification benefits the software developer by eliminating the need for the developer to run an IDL compiler and by speeding up the RPC mechanism. The RPC mechanism can be implemented so that it is faster than the conventional mechanism because it allows the developer to eliminate the need to translate between the middleware-specific data representation and the representation against which the developer codes. Furthermore, it allows the message to contain values that the service does not recognize or that an integration server provides for the service's optional use. For example, the message's encoding may evolve so that it contains more information than the service was originally designed to accept. This mechanism allows the service to continue to function with the new encoding by utilizing only the information that existed in the pervious version of the encoding. As another example, the integration server might include within the input Values object an entry that identifies the encoding in which the message was expressed.

One may improve this approach by adding a state parameter to each service signature so that the integration server can be responsible for managing the persistence of state. The service then manages the state by modifying this parameter. The integration server associates each client session with a particular state object and hands the state object to a service every time the client invokes the service. The state object might be a Values object or an object specifically designed to represent session state. The following code illustrates how this improvement could be expressed in the service signature:

Values addEmployee(Session session, Values inputs)

One of the apparent drawbacks of the single input object and single output object approach is that it requires the software developer to translate between the integration server representation of the data and the representation that the developer requires, should the developer require a different representation. The inventors mitigate this drawback by allowing the developer to use a special IDL compiler that generates utility software. The developer can then hand the input Values object to the generated software to have the developer-required data structures automatically generated for the developer. For example, the IDL compiler might generate the following Java code to convert an input values object into a native data structure:

```
class Address {
    String street1;
    String street2;
    String city;
    String state;
    String zip;
    Address (Values inputs) {
        street1 = inputs.get("street1");
        street2 = inputs.get("street2");
        city = inputs.get("city");
        state = inputs.get("state");
        zip = inputs.get("zip");
    }
}
```

The XML RPC improvements provide many benefits, including those already described in this section, and including the following improvements over conventional RPC mechanisms:
  The RPC mechanism operates statelessly over HTTP, requiring significantly less complex software is required to implement RPC over HTTP. The session-based state objects described in this section do not provide state for the RPC transfer protocol, but rather only provide state for the services that use the protocol, so that this state mechanism is not in violation of the requirement for stateless RPC. In any case, the session mechanism is not a mandatory feature of XML RPC.
  The RPC mechanism does not support bi-directional communications, requiring significantly less complex client software to implement RPC over HTTP. Only solutions that absolutely require bi-directional communications would suffer added complexity, and they might do so by putting an integration server on the client computer so that the client may also receive RPC messages.
  The RPC mechanism exhibits sufficient simplicity that two programs could engage in RPC communications over a network without requiring software from a single vendor to be installed on both of the computers that are running the programs. The client of a server that supports XML RPC only needs an XML parser and an HTTP stack. An implementation of the DOM API would also be preferable, but it would not be necessary. The client program can concatenate strings to generate XML and then submit the XML to the server via the standard HTTP GET or POST methods, and the client could parse the reply document that HTTP returns using the now-ubiquitous XML parser. The client would then use the DOM APIs to navigate the document to extract the data that the client requires. As this example demonstrates, in stark contrast to conventional RPC mechanisms, a client can use XML RPC without using any vendor client XML RPC software at all.

The 80/20 RPC Encoding

As previously stated, conventional RPC protocols such as IIOP and DCE use generic encodings that are not XML-based. These generic encodings essentially comprise the union of features required by the individual programming languages and the different software platforms. Consequently, conventional encodings are complex. For example, these encodings distinguish among a wide variety of data types, such as short integers, long integers, enumerations, floating-point numbers in various precisions, fixed-point numbers, unions, strings, and wide strings. In addition, these protocols must define the endianness and lengths of data items, including whether arrays are represented row-first or column-first. The protocols also support the communication of programming language exceptions, error information, synchronity, network-aware object references, and other sophisticated information. Consequently, the developers of conventional RPC solutions are almost universally reliant on software tools that completely hide the encodings from the developer.

One might easily design generic XML-based encodings that suffer from the same complexities. The RPC community has operated under the assumption that it is the encoding's responsibility to provide the superset of the features available to programming languages and software platforms, but the present assignees have created an RPC mechanism that allows varied programs to communicate via a simple generic encoding. This encoding is an XML-based encoding, and the assignees refer to it as the 80/20 RPC encoding. The encoding is based on the principle that an encoding should only provide the functionality required by 80% of the solutions that might use the encoding and that the remaining 20% should be relegated to protocols that layer on top of the encoding. The 80/20 RPC encoding provides about 80% of the functionality of conventional RPC encodings for less than 20% of the complexity.

It is not new to the RPC community to layer protocols on top of RPC encodings. The IDispatch interface is an example of such a layered protocol. However, the 80/20 RPC encoding provides a different partitioning of functionality among the layers. Instead of putting the self-describing layer on top of the layer that supports rich data types, the 80/20 RPC encoding puts the self-describing layer at the bottom and allows applications to build sophisticated data types on top of this layer. For example, DCE support unions while the 80/20 RPC encoding does not, but one may easily build unions on top of the 80/20 RPC encoding in the manner that IDispatch is built on DCE. As another example, consider that the 80/20 RPC does not natively support the referencing of network objects and asynchronous communications with those objects. Suppose an application requires this functionality, and suppose the application is using HTTP as the transport protocol. The application may provide asynchronous communications on top of the 80/20 RPC encoding by implementing the RPC in both directions by installing on both the client and server machines an integration server that uses the 80/20 RPC encoding over HTTP.

The 80/20 RPC encoding provides another significant benefit over conventional RPC encodings. This benefit is a consequence of the encoding being both text-based and flexible in its representation of data items. In the encoding, one uses text to represent the values of all data items. For example, an integer would be expressed as a sequence of human-readable decimal digits rather than the two, four, or eight binary bytes that IIOP or DCE would require. One may therefore buffer an integer with preceding zeroes, should this be a readability requirement. One may also place a floating-point value in a data item that expects an integer and have it automatically rounded to the nearest integer. Likewise, one may suffix numbers with a units indicator term (as in "30 barrels") and have the term ignored.

RPC mechanisms have heretofore not included such facilities for automated typecasting and human-readability accommodation. The 80/20 RPC approach inclines developers to design more human-accessible messages and further supports the philosophy that protocol layers above the encoding should assume responsibility for rich typing. It is expected that higher layers will grow unbounded in sophistication to support the endlessly rich variety of human-readable types.

In order for an encoding to provide this simplicity of expression and this repartitioning of functionality, the inventors had to select the domain of applicability for which the encoding would provide 80% of the required functionality. The inventors selected the domain of business-to-business integration over the Internet. This domain focuses on connecting applications to applications over the Internet, and the applications are typically self-contained except for their need to engage in business transactions with other businesses. The 80/20 RPC encoding is ideal for this usage and reflects the experience that the inventors have in this area.

The 80/20 RPC encoding is independent of the syntax used to express the encoding, but the inventors have implemented it in XML, so the present application expresses the encoding in XML. The encoding requires only six distinct labels, and the XML-based syntax expresses these labels as XML element type names. Each label corresponds to a type of data item. Each data item may also have additional descriptive information, but this information is optional. The XML-based representation expresses this optional information using XML attributes. The attributes available to any element type vary according to element type. The six element types and their attributes follow:

VALUE—This element represents a data item that is a lexical unit, and it has an optional TYPE attribute. Lexical units include integers, floating-point numbers, strings, boolean values, etc. They generally correspond to the primitive data types of most programming languages. The value of the optional TYPE attribute names the lexical type. The inventor's implementation uses lexical type names such as Integer, Long, Float, and String. VALUE elements that lack the TYPE attribute are assumed to be strings. Variations of the encoding might assume another type in the absence of the TYPE attribute, such as the integer type.

RECORD—This element contains (holds as children) a set of one or more named elements of any type. Each child is required to have a NAME attribute, and the value of each NAME attribute must be unique among the values of the NAME attributes of all children of the containing RECORD element. The NAME attribute serves as a means for attaching semantic labels to the data items, but semantic labels are not necessary, as one may also identify elements according to their position within the RECORD element. However, as described above, semantic labels add value to the message. The RECORD element is always the root element of an 80/20 RPC message.

LIST—This element contains a set of elements. The elements contained in a LIST do not have names; or if they do have names, the names are ignored.

OBJECT—This element references another element by object ID, and it has a mandatory REFERENCE attribute. Any element in the 80/20 RPC encoding may have an attribute of type ID. The value of the REFERENCE attribute is the value of the ID attribute of another element, and this other element is known as the element that the OBJECT element references. An OBJECT element serves as a placeholder for the element it references. An OBJECT element is equivalent to a programming language pointer or object reference to a software object. The element therefore provides a mechanism by which one software object may be included within two or more other objects. However, the element only serves as a suggestion to the server that when the server converts the message into software objects, the server should create only one instance of the referenced object.

NULL—This element represents a data item for which no data is provided. It is equivalent to a null-pointer in the case where it replaces objects that a programming language might represent using a pointer. It is equivalent to NULL or NIL in programming languages that are capable of distinguishing between assigned and unassigned variables of primitive data types. In the context of a containing RECORD, LIST, or ARRAY element (where the ARRAY element is not of a string type), the NULL element provides a simple way to disambiguate between the absence of a value and the occurrence of a null pointer. In the context of a containing VALUE or ARRAY element (where the ARRAY element is of a primitive type), the NULL element provides a simple way to disambiguate between the absence of a value and presence of either the empty string or a numeric value of zero.

ARRAY—This element represents a single or multi-dimensional array of elements, and it has an optional DIMENSION attribute and an optional TYPE attribute. The DIMENSION attribute indicates the dimensionality or depth of the array, and the TYPE attribute indicates the type of data found in the array. Both of these attributes are optional, since the same information can be acquired by examining the content of the ARRAY element, but their presence facilitates the efficient processing of the message by allowing the server to allocate the required memory prior to processing the content of the ARRAY element. All immediate children of an ARRAY element must be of the same element type, except that NULL elements are always valid.

Any element may have a NAME attribute. The value of the NAME attribute uniquely identifies the element within a containing RECORD element and is only required when the element is a child of a RECORD element. No two NAME attribute values may be identical within the scope of the same parent RECORD element. The purpose of the NAME attribute is to give semantic labels to the data items in a RECORD element. The NAME attribute is ignored when it occurs in any position other than as the attribute of a child of a RECORD element.

Any element may also have an ID attribute. The value of the ID attribute uniquely identifies the element within the 80/20 RPC message. No two ID attribute values may be identical within the scope of the same RPC message. The purpose of the ID attribute is to allow a single data item to be contained in multiple data items. Without the ID attribute and the OBJECT element, the RPC messages would only be able to express tree data structures. With the ID attribute and the OBJECT element, the RPC messages can express arbitrary directed graphs, including cyclic graphs.

Notice that the preferred embodiment of 80/20 RPC associates at least one type label and at least one semantic label with every data item. Data items are represented by XML elements, and the element type name of an XML element serves as a type label, except for the OBJECT element name. However, each OBJECT element references another element that does have an associated type label; the type label associated with the referenced element is therefore also a type label of the OBJECT element. The VALUE and ARRAY elements may have multiple associated type labels that together define the data type of the associated data item.

Likewise, every argument and every data item contained in every argument is associated with at least one semantic label. The semantic label of a data item that resides in a RECORD element is the value of the NAME attribute that is present on the element. The semantic label of any data item not already having a semantic label is the semantic label associated with nearest ancestor RECORD element of the element representing the data item. For example, if a list has semantic label X within a record, then the data items contained in the list each have semantic label X. To be more concrete, if an array of products is labeled "ProductList," then every product in the array is labeled "ProductList." Notice that the semantic label attached to an OBJECT element is never the semantic label of the data item that the element references.

The 80/20 RPC relegates to the transfer protocol all responsibility for identifying the service that is to be invoked, so no element in the encoding actually names the target service. Consider the following Java classes:

```
class Person {
    String name;
    Integer age;
    Address address;
    Job[ ] jobHistory;
    Vector credentials; // Degrees and Awards
}
class Address {
    String[ ] streetLines;
    String zip;
}
class Degree {
    String degree;
    String school;
}
class Award {
    String award;
    String date;
}
class Job {
    String company;
    Address address;
    String title;
}
```

Suppose a client wishes to invoke a service having the following Java signature:

Job addEmployee(Person p)

The service adds an employee to the employee database, determines an appropriate job for the employee and returns the description of that job. When the client invokes this service the client puts the service name somewhere in the transfer protocol header. In the case of HTTP, it is economical to name the service within the URL or URI. The client then sends an 80/20 RPC message to the server.

Here is an example of a message that the client might send for this particular service:

```
<RECORD>
    <VALUE NAME="name">Joe Shmoe</VALUE>
    <VALUE NAME="age" TYPE="Integer">30</VALUE>
```

-continued

```
    <RECORD NAME="address" ID="A1">
        <ARRAY NAME="streetLines">
            <VALUE>1234 Someplace Court</VALUE>
        </ARRAY>
        <VALUE NAME="zip">112233</VALUE>
    </RECORD>
    <ARRAY NAME="jobHistory" TYPE="RECORD">
        <RECORD>
            <VALUE NAME="company">Big Deal Corp.
                </VALUE>
            <RECORD NAME="address">
                <ARRAY NAME="streetLines">
                    <VALUE>99 Business Lane</VALUE>
                    <VALUE>Suite 1010</VALUE>
                </ARRAY>
                <VALUE NAME="zip">112233</VALUE>
            </RECORD>
            <VALUE NAME="title">Worker</VALUE>
        </RECORD>
        <RECORD>
            <VALUE NAME="company">Shmoe's Consulting
                </VALUE>
            <OBJECT NAME="address" REFERENCE="A1"/>
            <VALUE NAME="title">Owner</VALUE>
        </RECORD>
    </ARRAY>
    <LIST NAME="credentials">
        <RECORD>
            <VALUE NAME="degree">Thinking</VALUE>
            <VALUE NAME="school">MIT</VALUE>
        </RECORD>
        <RECORD>
            <VALUE NAME="award">Big Shot</VALUE>
            <VALUE NAME="date">1/1/98</VALUE>
        </RECORD>
        <VALUE>Nobel Prize for Physics</VALUE>
    </LIST>
</RECORD>
```

Notice a few characteristics of this message. The message describes a person and includes the person's address and the address of the person's various employers. At one point the person worked for himself and hence his employer's address is identical to his home address. The message represents this by having the Job entry for this employment period reference the same object that describes the person's home address. The message could have duplicated the object in order to make the message conform strictly to a tree, but this makes inefficient use of memory. Also, if the address is found to be in error or if the zip code subsequently changes, the resulting data structure can be corrected by changing one RECORD instead of changing two.

Also notice that the LIST element may contain a mix of element types. Each programming language will have to find a suitable representation for this notion. The LIST element is intended to be the mechanism by which objects of arbitrary types may be collected together into a single list of arbitrary length. For example, this construct is useful for representing instances of Java's Vector class. Programming languages such as Visual Basic might represent LIST elements as VARIANT variables. Languages such as C and C++ might represent LIST elements using special data types that provide information about the type of each element.

The above example does not illustrate multi-dimensional arrays. An array of dimension two or greater is represented by nesting ARRAY elements within ARRAY elements. The depth of the nesting equals the dimensionality minus one. This approach takes advantage of the fact that the encoding is expressed in XML and is not otherwise available to conventional binary representations of arrays. A conventional binary representation of a multi-dimensional array is defined by a set of dimension sizes, and the size of each dimension except for the last dimension must be known. For example, expressed in XML the analogue of a conventional representation might appear as follows for a two-dimensional array:

<BINARY-LIKE-ARRAY DIMENSION-SIZES="2,3">
  <VALUE>this is 0,0</VALUE>
  <VALUE>this is 0,1</VALUE>
  <VALUE>this is 0,2</VALUE>
  <VALUE>this is 1,0</VALUE>
  <VALUE>this is 1,1</VALUE>
  <VALUE>this is 1,2</VALUE>
</BINARY-LIKE-ARRAY>

The 80/20 RPC expresses the above array as follows:

```
<ARRAY DIMENSION="2">
    <ARRAY>
        <VALUE>this is 0,0</VALUE>
        <VALUE>this is 0,1</VALUE>
        <VALUE>this is 0,2</VALUE>
    </ARRAY>
    <ARRAY>
        <VALUE>this is 1,0</VALUE>
        <VALUE>this is 1,1</VALUE>
        <VALUE>this is 1,2</VALUE>
    </ARRAY>
</ARRAY>
```

Consider another example. Here is the analogue of a three-dimensional binary array:

<BINARY-LIKE-ARRAY DIMENSION-SIZES="2,2,2">
  <VALUE> 0, 0, 0</VALUE>
  <VALUE> 0, 0, 1</VALUE>
  <VALUE> 0, 1, 0</VALUE>
  <VALUE> 0, 1, 1</VALUE>
  <VALUE> 1, 0, 0</VALUE>
  <VALUE> 1, 0, 1</VALUE>
  <VALUE> 1, 1, 0</VALUE>
  <VALUE> 1, 1, 1</VALUE>
</BINARY-LIKE-ARRAY>

The 80/20 RPC expresses the above array as follows:

```
<ARRAY DIMENSION="3">
    <ARRAY>
        <ARRAY>
            <VALUE> 0, 0, 0 </VALUE>
            <VALUE> 0, 0, 1 </VALUE>
        </ARRAY>
        <ARRAY>
            <VALUE> 0, 1, 0 </VALUE>
            <VALUE> 0, 1, 1 </VALUE>
        </ARRAY>
    </ARRAY>
    <ARRAY>
        <ARRAY>
            <VALUE> 1, 0, 0 </VALUE>
            <VALUE> 1, 0, 1 </VALUE>
        </ARRAY>
        <ARRAY>
            <VALUE> 1, 1, 0 </VALUE>
            <VALUE> 1, 1, 1 </VALUE>
        </ARRAY>
    </ARRAY>
</ARRAY>
```

This approach to representing arrays allows an ARRAY element to represent an array of pointers (or object references) to arrays. Thus, it is not necessary to require that the array entries for a given dimension of the array be represented internally with identical array sizes. Also, the ARRAY element nesting approach provides a more natural way for humans to view the structure of the array within the XML representation.

Reply messages of the 80/20 RPC are expressed in the same encoding as the request messages. Here is an example of a reply message for the above request message:

```
<RECORD>
    <VALUE NAME="company">New Employer Corp.</VALUE>
    <RECORD NAME="address">
        <ARRAY NAME="streetLines">
            <VALUE>5 New Company Plaza</VALUE>
            <VALUE>Suite 4321</VALUE>
        </ARRAY>
        <VALUE NAME="zip">10203</VALUE>
    </RECORD>
    <VALUE NAME="title">Manager</VALUE>
</RECORD>
```

In the preceding examples, both the client and the server receive RECORD elements that correspond to the Job class portrayed above. The client and the server may chose distinct representations for this RECORD element. One side might represent it as a Values object, while the other side might construct a more dedicated structure to hold the object, such as a C struct instance. The inventors have implemented an extension to the RECORD element whereby a CLASS attribute may be attached to the element to identify the Java class that the RECORD represents. This extension serves as a suggestion for Java implementations so that a Java implementation may represent the element using an instance of the named class. The above reply message might therefore be expressed as follows:

```
<RECORD CLASS="Job">
    <VALUE NAME="company">New Employer Corp.</VALUE>
    <RECORD NAME="address">
        <ARRAY NAME="streetLines">
            <VALUE>5 New Company Plaza</VALUE>
            <VALUE>Suite 4321</VALUE>
        </ARRAY>
        <VALUE NAME="zip">10203</VALUE>
    </RECORD>
    <VALUE NAME="title">Manager</VALUE>
</RECORD>
```

Non-Java implementations could chose to ignore this attribute, or they could use the attribute to perform equivalent behavior. For example, a C++ or Smalltalk implementation could construct a class instance for a class having this name. The approach to naming RECORD element class could also have been applied to the credential records as follows:

<RECORD CLASS="Degree">
  <VALUE NAME="degree">Thinking</VALUE>
  <VALUE NAME="school">MIT</VALUE>
</RECORD>
<RECORD CLASS="Award">
  <VALUE NAME="award">Big Shot</VALUE>
  <VALUE NAME="date">1/1/98</VALUE>
</RECORD>

There are several functionally equivalent variations of this RPC encoding. One might select one variation over another according to one's preferences for how readable messages are when expressed in the encodings. A particular variation of the above-described 80/20 RPC encoding separates numeric values and string values into separate elements. For example, one might use the VALUE element type exclusively for string values while using a NUMBER element type for numeric values. The NUMBER element type could support a TYPE attribute to distinguish among types. Another variation assigns each lexical type to its own element type. Such an encoding might support the element types STRING, INTEGER, FLOAT, etc.

There is also value in an encoding that does not distinguish among lexical data types at all. In this encoding all lexical data types are expressed as strings. For example, the VALUE element would be used to express strings and the element would not support the optional TYPE attribute. No other element types would exist to differentiate among lexical types. This approach moves the encoding further in the direction of relegating type information to software layers that reside above the encoding layer. The servers and clients would take responsibility for assigning different programming-language specific data types to the individual data items. Such software could accomplish this by associating each service with a specification for that service, where the specification could be given in an interface specification expressed in some Interface Definition Language (IDL). Alternatively, application-specific code could impose the data types. This approach has the benefit that it frees users to choose more human-readable encodings, although it does so at the expense of additional complexity in the software that must interpret the messages.

It is also possible define a variation of the 80/20 RPC encoding such that the variation names the service-to-invoke within the RPC request message instead of naming this service via the transfer protocol. The service name might be provided as the value of an XML attribute, for example. The two approaches are functionally equivalent, except that if the message names the target service, the server must first parse the message to identify the service, which introduces potential inefficiencies. For example, should the client issuing the request not have access rights to use the service, the server would still have to parse message before denying access. Were the service named via the transfer protocol, the server could have spared the clock cycles and memory necessary to parse the message by ignoring the message and sending the client an error response instead. However, messages that name the target service have the advantage of being complete, so that a user examining the message can readily determine the service for which the message is intended.

The following example illustrates naming the service-to-invoke by using an attribute of the containing RECORD message:

<RECORD SERVICE="addEmployee">
      <VALUE NAME="name">Joe Shmoe</VALUE>
      . . .
    </RECORD>

In another variation of the 80/20 RPC, one might reserve a special element type, such as the RPC element type, for this purpose. This produces a cleaner solution, since the SERVICE attribute is only meaningful on the outermost element of the message. All request messages would then be expressed in terms of this element type. The same element type might also be used to enclose reply messages. In this case it would be useful for the user to have an indication of whether a given message is a request or a reply message. This could be accomplished via a TYPE attribute on this outermost element. The resulting encoding yields messages such as those presented earlier in this application:

<RPC TYPE="REQUEST">
      <VALUE NAME="accountID" TYPE="int">2001</VALUE>
      <VALUE NAME="zodiacSign">Aquarius</VALUE>
    </RPC>
    <RPC TYPE="REPLY">
      <VALUE NAME="orderNumber" TYPE="int">38553</VALUE>
      <VALUE NAME="fortune">XML is good for RPC</VALUE>
      <VALUE NAME="balance" TYPE="float">65.00</VALUE>
    </RPC>

The 80/20 RPC encoding has been expressed here in the syntax of XML, but the value of the encoding is in the data types and the data structures that the encoding uses to represent RPC messages. The encoding could easily be expressed in other syntaxes, including proprietary syntaxes. Messages expressed in the encoding are capable of representing the programming language data types that are most commonly used for business-to-business integration over the Internet. The simplicity and self-describing nature of the encoding lends the encoding the following benefit over conventional RPC encodings:

The 80/20 RPC encoding is simpler than IIOP and DCE. By containing only the features that are necessary for business-to-business electronic commerce over the Internet, it idealizes the encoding for this domain of applications. Furthermore, the encoding's simplicity maximizes the number of software developers that are qualified to produce solutions with the encoding and minimizes the time required to produce each solution.

Important Features

This specification has portrayed a flexible mechanism for implementing RPC. There are a wide variety of ways to implement the invention. One may classify each implementation according to the particular combination of features that the implementation exhibits. This section of the specification itemizes some of these important features. For each feature itemized here, the section also lists some of the modes in which the feature may be expressed in an implementation.

Encoding syntax. Although the specification has focused on using XML as the syntax, the invention is not limited to expression in the XML syntax. The self-describing properties of the message encoding are inventive properties. Hence, one might also express the invention using a binary encoding, a text-based encoding, and an encoding in a markup language other than XML.

Transfer protocol. The specification has focused on using network transfer protocols such as HTTP, SMTP, and FTP, but it is possible to express the invention in other protocols. For example, one might define a proprietary protocol for this purpose. The definition of protocol used by this specification also encompasses the mechanisms by which virtual machines communicate and by which processes in separate address spaces communicate. In particular, the transfer protocol covers many IPCs (Inter-Process Communications).

Service invoked. The specification describes the invention in terms of the services that the invention may be used to invoke. The term 'service' has been described in an abstract way. Services include functions (including procedures and class methods), web sites, and databases. They also may include middleware platforms, enterprise applications, and any of a myriad set of application protocols.

Argument labels. The specification has described labeling a message argument with a type label. One may label a single argument in this manner, two or more arguments in this manner, or all arguments in this manner. In addition, one may associate a semantic label with arguments having type labels. A semantic label might exist for one of these arguments, for two or more of these arguments, or for all of these arguments.

Constituent labels. The specification has described labeling a data item with a semantic label. In particular, it has described labeling a data item that is contained within an argument. An argument might contain multiple data items. One might label a single such data item, two or more such data items, or all such data items. Furthermore, one might associate a type label with a data item already having an associated semantic label. A type label might exist for one of these data items, for two or more of these data items, or for all of these data items.

Label constraints. As described above, various schemes exist for labeling arguments, and various schemes exist for labeling constituent data items. One might also associate these labeling schemes. For example, an encoding might allow argument labels without regard to whether any constituents of the argument are labeled, and one might allow a constituent of an argument to be labeled without regard to whether the argument is labeled. An encoding might also establish constraints between these labeling schemes. For example, an encoding might require that all constituents of a labeled argument also be labeled. Such constraints add value by allowing an application to optimize for a particular scheme. Requiring that all data items (including arguments) always have both type labels and semantic labels eliminates the need for applications to maintain type and semantic information about the messages it recognizes.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of invoking a service at a first machine from a second machine, said method comprising the steps of:

generating a service invocation request message at said second machine in compliance with a markup language-based message encoding wherein said message includes elements representing data items of at least one argument and associated with type labels selected from a group of type labels, said group including at least an array type label indicating that the corresponding element is an array element representing an n-dimensional array containing a plurality of data items, where n is an integer and $n \geq 1$, said message including at least one element associated with said array type label and representing a multi-level nested array where each element nesting level corresponds to a respective dimension of said array; and transmitting said service invocation request message from said second machine.

2. A method of invoking a service at a first machine, comprising the steps of:

receiving at said first machine a service invocation request message generated at a second machine in compliance with a markup language-based message encoding wherein said message includes elements representing data items of at least one argument and associated with type labels selected from a group of type labels, said group including at least an array type label indicating that the corresponding element is an array element representing an n-dimensional array containing a plurality of data items, where n is an integer and $n \geq 1$, said message including at least one element associated with said array type label and representing a multi-level nested array where each element nesting level corresponds to a respective dimension of said array; and invoking said service in response to said message.

3. A method of invoking a service at a first machine, said method comprising the steps of:

receiving at said first machine a service invocation request;

invoking said service in response to said request; and transmitting from said first machine a service invocation reply message in compliance with a markup language-based message encoding wherein said message includes elements representing data items of at least one argument and associated with type labels selected from a group of type labels, said group including at least an array type label indicating that the corresponding element is an array element representing an n-dimensional array containing a plurality of data items, where n is an integer and $n \geq 1$, said message including at least one element associated with said array type label and representing a multi-level nested array where each element nesting level corresponds to a respective dimension of said array; and transmitting said service invocation reply message from said second machine.

4. A method of invoking a service at a first machine, said method comprising the steps of:

transmitting a service invocation request from a second machine; and receiving at said second machine a service invocation reply message in compliance with a markup language-based message encoding wherein said message includes elements representing data items of at least one argument and associated with type labels selected from a group of type labels, said group including at least an array type label indicating that the corresponding element is an array element representing an n-dimensional array containing a plurality of data items, where n is an integer and $n \geq 1$, said message including at least one element associated with said array type label and representing a multi-level nested array where each element nesting level corresponds to a respective dimension of said array.

5. A method of invoking a service at a first machine from a second machine, said method comprising the steps of:

generating a service invocation request message at said second machine in compliance with a mark-up language-based message encoding wherein said message includes elements representing data items of at least one argument and associated with type labels selected from a group including at least an array type label indicating that the corresponding element is an array element representing an n-dimensional array containing a plurality of data items, where n is an integer and n≧1, said request message including at least one element associated with said array type label and representing an array of dimension n and further including an array label associated with said at least one element and requiring that all data items represented within said array have the same type as one another; and transmitting said service invocation request message from said second machine.

6. A method of invoking a service at a first machine, comprising the steps of:

receiving at said first machine a service invocation request message generated at a second machine in compliance with a markup language-based message encoding wherein said message includes elements representing data items of at least one argument and associated with type labels selected from a group including at least an array type label indicating that the corresponding element is an array element representing an n-dimensional array containing a plurality of data items, where n is an integer and n≧1, said request message including at least one element associated with said array type label and representing an array of dimension n and further including an array label associated with said at least one element and requiring that all data items represented within said array have the same type as one another; and invoking said service in response to said message.

7. A method of invoking a service at a first machine, said method comprising the steps of:

receiving at said first machine a service invocation request;

invoking said service in response to said request; and transmitting from said first machine a service invocation reply message in compliance with a markup language-based message encoding wherein said message includes elements representing data items of at least one argument and associated with type labels selected from a group including at least an array type label indicating that the corresponding element is an array element representing an n-dimensional array containing a plurality of data items, where n is an integer and n≧1, said reply message including at least one element associated with said army type label and representing an array of dimension n and further including an array label associated with said at least one element and requiring that all data items represented within said array have the same type as one another; and transmitting said service invocation reply message from said second machine.

8. A method of invoking a service at a first machine, said method comprising the steps of:

transmitting a service invocation request from a second machine; and receiving at said second machine a service invocation reply message in compliance with a markup language-based message encoding wherein said message includes elements representing data items of at least one argument and associated with type labels selected from a group including at least an array type label indicating that the corresponding element is an array element representing an n-dimensional array containing a plurality of data items, where n is an integer and n≧1, said reply message including at least one element associated with said array type label and representing an array of dimension n and further including an array label associated with said at least one element and requiring that all data items represented within said array have the same type as one another.

9. A method according to any one of claims 5–8, wherein said array label identifies said same type.

10. A method according to any one of claims 5–8, wherein said mark-up language is XML, said at least one element is expressed as an XML element, and said array label is expressed as an XML attribute of said XML element such that the dimension n is given by the value of said XML attribute.

11. A method according to any one of claims 1–4 and 5–8, wherein said message is an XML document.

12. A method according to any one of claims 1–4, wherein said message includes a type label associated with the nesting element at each said element nesting level and designating said nesting element as having an array type.

13. A method according to claim 12, wherein said nesting element contains at least one member element representing a data item, with all data items represented by the direct children elements of said nesting element being of the same type as one another.

14. A method according to claim 13, wherein said message includes an array label associated with said nesting element and said array label indicates the type associated with all data items represented by said direct children elements.

15. A method according to any one of claims 1–4, wherein said message includes an array label associated with said nesting element and said array label indicates a value of n but does not indicate a size for each of said n dimensions.

16. A method according to any one of claims 1–4, wherein said message includes an array label associated with said at least one element and requiring that all data items contained within said array have the same type as one another.

17. A method according to claim 16, wherein said array label identifies said same type.

18. A method according to any one of claims 1–4, wherein all elements in said message designating data items are associated with type labels.

19. A method of invoking a service at a first machine from a second machine, comprising the steps of:

generating a service invocation request message at said second machine in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, and a third type label for designating an element containing other elements associated with type labels selected from said group; and transmitting said message.

20. A method according to claim 19, wherein said group includes at least a fourth type label and a fifth type label always designating an element containing a data item specifying an ID value, wherein said message associates an element having said fourth type label with an ID value, and wherein said message includes an element associated with said fifth type label which specifies said ID value.

21. A method according to claim 19, wherein said group includes at least one placeholder type label that designates a placeholder element which represents the absence of data.

22. A method of invoking a service at a first machine, comprising the steps of:
  receiving at said first machine a service invocation request message generated at a second machine in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, and a third type label for designating an element containing other elements associated with type labels selected from said group; and
  invoking said service in response to said message.

23. A method according to claim 22, wherein said group includes at least a fourth type label and a fifth type label always designating an element containing a data item specifying an ID value, wherein said message associates an element having said fourth type label with an ID value, and wherein said message includes an element associated with said fifth type label which specifies said ID value.

24. A method according to claim 22, wherein said group includes at least one placeholder type label that designates a placeholder element which represents the absence of data.

25. A method of invoking a service at a first machine, said method comprising the steps of:
  receiving at said first machine a service invocation request;
  invoking said service in response to said request; and
  transmitting from said first machine a service invocation reply message in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, and a third type label for designating an element containing other elements associated with type labels selected from said group.

26. A method according to claim 25, wherein said group includes at least a fourth type label and a fifth type label always designating an element containing a data item specifying an ID value, wherein said message associates an element having said fourth type label with an ID value, and wherein said message includes an element associated with said fifth type label which specifies said ID value.

27. A method according to claim 25, wherein said group includes at least one placeholder type label that designates a placeholder element which represents the absence of data.

28. A method of invoking a service at a first machine, said method comprising the steps of:
  transmitting a service invocation request from a second machine; and
  receiving at said second machine a service invocation reply message in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, and a third type label for designating an element containing other elements associated with type labels selected from said group.

29. A method according to claim 28, wherein said group includes at least a fourth type label and a fifth type label always designating an element containing a data item specifying an ID value, wherein said message associates an element associated with said fourth type label with an ID value, and wherein said message includes an element associated with said fifth type label which specifies said ID value.

30. A method according to claim 28, wherein said group includes at least one placeholder type label that designates a placeholder element which represents the absence of data.

31. A method of invoking a service at a first machine from a second machine, comprising the steps of:
  generating a service invocation request message at said second machine in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, said encoding providing a lexical type indicator associated with an element having said first type label and wherein an element associated with said first type label with no lexical type indicator is assumed to contain data of string lexical type; and
  transmitting said message.

32. A method of invoking a service at a first machine, comprising the steps of:
  receiving at said first machine a service invocation request message generated at a second machine in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, said encoding providing a lexical type indicator associated with an element having said first type label and wherein an element associated with said first type label with no lexical type indicator is assumed to contain data of string lexical type; and
  invoking said service in response to said message.

33. A method of invoking a service at a first machine, said method comprising the steps of:
  receiving at said first machine a service invocation request;
  invoking said service in response to said request; and
  transmitting from said first machine a service invocation reply message in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, said encoding providing a lexical typo indicator associated with an element having said first type label and wherein an element associated with said first type label with no lexical type indicator is assumed to contain data of string lexical type.

34. A method of invoking a service at a first machine, said method comprising the steps of:
transmitting a service invocation request from a second machine; and
receiving at said second machine a service invocation reply message in compliance with a markup language-based message encoding, wherein said message includes plural elements representing data items of at least one argument and associated with type labels selected from an encoding group having a predetermined number of members, including at least a first type label for designating an element containing lexical data, and a second type label for designating an element containing other elements associated with type labels selected from said group, said encoding providing a lexical type indicator associated with an element having said first type label and wherein an element associated with said first type label with no lexical type indicator is assumed to contain data of string lexical type.

35. A method according to any one of claims 19–28, wherein said encoding group includes a fourth type label for designating an element containing other elements associated with type labels selected from said group.

36. A method according to any one of claims 19–28, wherein said encoding group includes a fourth type label for designating an element uniquely identifying another element within a particular message.

37. A method according to claim 36, wherein said encoding group includes a fifth type label for designating the absence of data.

38. A method according to claim 37, wherein said encoding group includes a sixth type label for designating an element containing other elements associated with type labels selected from said group.

39. A method according to any one of claims 19–28, wherein said encoding group includes a fourth type label for designating the absence of data.

40. A method according to any one of claims 19, 22, 25, 28, wherein said third type label designates an element containing an n-dimensional array (where n is an integer such that n≧1) of elements associated with type labels selected from said encoding group.

41. A method according to any one of claims 19, 22, 25, 28, wherein said encoding provides a lexical type indicator associated with an element having said first type label.

42. A method according to claim 41, wherein an element associated with said first type label with no lexical type indicator is assumed to contain data of string lexical type.

43. A method according to claim 41, wherein said markup language is XML, said elements are expressed as XML elements, said type labels are expressed as XML element type names, and said lexical type indicator is expressed as an XML attribute on an XML element associated with said first type label, with the lexical type of the data contained in said XML element being designated by the value of said XML attribute.

44. A method according to any one of claims 19, 22, 25, 28, wherein said encoding group further includes a fourth type label for designating an element representing a numeric value.

45. A method according to any one of claims 19, 22, 25, 28, wherein said encoding group includes multiple type labels each designating a respective different type of lexical data contained in an associated element.

46. A method according to any one of claims 19, 22, 25, 28, wherein said message further includes a semantic label for at least one data item of an argument in said message.

47. A method according to claim 46, wherein said markup language is XML, said at least one element is expressed as an XML element, and said semantic label is expressed as the value of an XML attribute on said XML element.

48. A method according to any one of claims 21, 24, 27, 30, wherein said placeholder element represents a programming language null object reference.

49. A method according to any one of claims 21, 24, 27, 30, wherein said placeholder element identifies an element contained elsewhere in said message.

50. A method according to any one of claims 21, 24, 27, 30, wherein said message includes a second type label associated with said placeholder element.

51. A method according to claim 50, wherein said message includes a semantic label associated with said placeholder element.

52. A method according to any one of claims 21, 24, 27, 30, wherein said message includes a semantic label associated with said placeholder element.

53. A method according to any one of claims 20, 23, 26, 29, wherein said encoding permits any element in a message to be associated with an ID which uniquely identifies said element within said message.

54. A method according to claim 53, wherein said markup language is XML, said element is expressed as an XML element, and said ID is associated with said element via an XML attribute on said XML element whose value is said ID.

55. A method according to any one of claims 5–8 or 20, 23, 26, 29, 21, 24, 27, 30, wherein all elements of said message representing data items are associated with type labels.

* * * * *